US010795662B2

(12) United States Patent
Gadgil et al.

(10) Patent No.: US 10,795,662 B2
(45) Date of Patent: Oct. 6, 2020

(54) SCALABLE ARTIFACT DISTRIBUTION

(71) Applicant: salesforce.com, inc., San Francisco, CA (US)

(72) Inventors: Harshawardhan Shamsundar Gadgil, Mountain View, CA (US); Brian Whitten, Burlingame, CA (US); Christopher Walter Anderson, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/272,718

(22) Filed: Feb. 11, 2019

(65) Prior Publication Data
US 2020/0257514 A1    Aug. 13, 2020

(51) Int. Cl.
  *G06F 9/44* (2018.01)
  *G06F 8/65* (2018.01)
  *H04L 29/08* (2006.01)

(52) U.S. Cl.
  CPC .............. *G06F 8/65* (2013.01); *H04L 67/108* (2013.01); *H04L 67/34* (2013.01)

(58) Field of Classification Search
  CPC ........................................................ G06F 8/65
  USPC ........................................................ 717/172
  See application file for complete search history.

(56) References Cited

U.S. PATENT DOCUMENTS

| 7,058,722 | B2 * | 6/2006 | Ikami | H04L 29/06 709/213 |
| 7,480,782 | B2 * | 1/2009 | Garthwaite | G06F 12/0253 711/170 |
| 8,533,231 | B2 * | 9/2013 | Aizman | G06F 16/182 707/793 |
| 9,363,623 | B2 * | 6/2016 | Nakamura | H04W 4/50 |
| 9,804,925 | B1 * | 10/2017 | Carmi | G06F 11/0763 |
| 9,811,532 | B2 * | 11/2017 | Parkison | G06F 3/0611 |
| 10,055,212 | B2 * | 8/2018 | Snider | H04L 67/06 |
| 10,067,652 | B2 * | 9/2018 | Kleinpeter | G06F 16/27 |
| 10,185,549 | B2 * | 1/2019 | Simek | H04L 67/02 |
| 10,515,003 | B1 * | 12/2019 | Alford | G06F 11/3688 |
| 2010/0235332 | A1 * | 9/2010 | Haustein | G06F 16/221 707/692 |

(Continued)

OTHER PUBLICATIONS

Wei Quan et al.; "ICN Based Vehicle-to-Cloud Delivery for Multimedia Streaming in Urban Vehicular Networks"; IEEE Sep. 2016.*

(Continued)

*Primary Examiner* — Francisco J Aponte
(74) *Attorney, Agent, or Firm* — Compass IP Law, PC

(57) ABSTRACT

System and methods are described for distributing artifacts in a cloud computing environment. Processing includes receiving an artifact at an upstream computing system in a network of computing systems, the artifact including a file of a continuous integration (CI) process, dividing the artifact into chunks, storing the chunks into a shared storage of the upstream computing system accessible by downstream computing systems of the network, determining downstream computing systems in the network to receive the artifact, receiving a request from one of the downstream computing systems for a chunk of the artifact; and providing the chunk to the downstream computing system from the shared storage.

30 Claims, 20 Drawing Sheets

(56) References Cited

U.S. PATENT DOCUMENTS

| | | | | |
|---|---|---|---|---|
| 2010/0318632 | A1* | 12/2010 | Yoo | H04L 65/605 709/219 |
| 2011/0055312 | A1* | 3/2011 | Purdy, Sr. | H04L 29/12066 709/203 |
| 2011/0072059 | A1* | 3/2011 | Guarraci | G06F 16/27 707/823 |
| 2011/0099200 | A1* | 4/2011 | Blount | G06F 16/152 707/770 |
| 2011/0153570 | A1* | 6/2011 | Kim | G06F 11/1662 707/652 |
| 2011/0196822 | A1* | 8/2011 | Zunger | G06F 16/27 707/609 |
| 2011/0196900 | A1* | 8/2011 | Drobychev | G06F 16/23 707/812 |
| 2011/0252071 | A1* | 10/2011 | Cidon | G06F 16/178 707/802 |
| 2012/0311080 | A1* | 12/2012 | Alsina | H04L 67/2842 709/217 |
| 2013/0036427 | A1* | 2/2013 | Chen | G06F 9/546 719/312 |
| 2013/0232229 | A1* | 9/2013 | Firman | G06F 8/61 709/219 |
| 2013/0318211 | A1* | 11/2013 | Kent | H04L 67/10 709/219 |
| 2014/0229455 | A1* | 8/2014 | Bestler | G06F 16/1752 707/695 |
| 2014/0324929 | A1* | 10/2014 | Mason, Jr. | G06F 16/1774 707/827 |
| 2015/0100684 | A1* | 4/2015 | Maes | G06F 11/3672 709/224 |
| 2015/0178007 | A1* | 6/2015 | Moisa | G06F 16/156 713/190 |
| 2015/0199197 | A1* | 7/2015 | Maes | G06F 8/71 717/122 |
| 2016/0119412 | A1* | 4/2016 | Gouge | H04N 21/232 713/168 |
| 2016/0147855 | A1* | 5/2016 | Bhagat | G06F 16/2365 707/620 |
| 2016/0150012 | A1* | 5/2016 | Barszczak | G06F 3/0607 709/219 |
| 2016/0191250 | A1* | 6/2016 | Bestler | G06F 16/2255 713/168 |
| 2016/0323358 | A1* | 11/2016 | Malhotra | H04L 67/1097 |
| 2017/0126787 | A1* | 5/2017 | Martinez | G06Q 10/06 |
| 2017/0168793 | A1* | 6/2017 | Singh | G06F 8/656 |
| 2018/0060066 | A1* | 3/2018 | Rihani | G06F 8/71 |
| 2018/0205759 | A1* | 7/2018 | Hosie | H04L 63/20 |
| 2018/0218005 | A1* | 8/2018 | Kuhtz | G06F 8/44 |
| 2019/0065525 | A1* | 2/2019 | Malhotra | H04L 63/0428 |
| 2019/0163739 | A1* | 5/2019 | Marascu | G06F 40/211 |
| 2019/0235993 | A1* | 8/2019 | Modeel | G06F 11/3696 |
| 2019/0243742 | A1* | 8/2019 | Natari | G06F 8/77 |
| 2019/0318282 | A1* | 10/2019 | Patel | G06F 8/60 |

OTHER PUBLICATIONS

"Enterprise+ An End-To-End Platform for Global Devops" White Paper, www.jfrong.com, JFrog.Ltd, Feb. 2018, 16 pages.

"Using Artifactory to Manage Binaries Across Multi-Site Topologies" www.jfrong.com, JFrog.Ltd, Dec. 2017, 29 pages.

* cited by examiner

1300

SCALABLE ARTIFACT DISTRIBUTION

TECHNICAL FIELD

One or more implementations relate to cloud computing systems, and more specifically to distributing files of a continuous integration (CI) process in a cloud computing environment.

BACKGROUND

"Cloud computing" services provide shared resources, software, and information to computers and other devices upon request or on demand. Cloud computing typically involves the over-the-Internet provision of dynamically-scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

In some cloud computing environments, there is a need to frequently update the software applications and/or information provided to end-users. This involves distributing files that are part of the software applications and/or information across the cloud computing network infrastructure to end-users in a process known as continuous integration (CI). Supporting a CI process in a large-scale cloud computing environment can create bottlenecks and inefficiencies in file distribution.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

DETAILED DESCRIPTION

In a multi-tier, multi-tenant cloud computing environment that hosts one or more computing systems with thousands (or more) of cohabiting tenants (e.g., also known as users or customers), hundreds of thousands (or more) of users make high volumes of transactions with widely varying workload characteristics. Each tenant can develop, deploy, and use the cloud computing environment at will, resulting in ever-changing tenant workload characteristics that constantly evolve over time. Simultaneously, the infrastructure of the cloud computing environment is continuously evolving (e.g., additional capabilities are being added, such as increased processing power, additional memory and storage, improved and/or additional networking throughput and bandwidth, etc.).

Figure 1A:
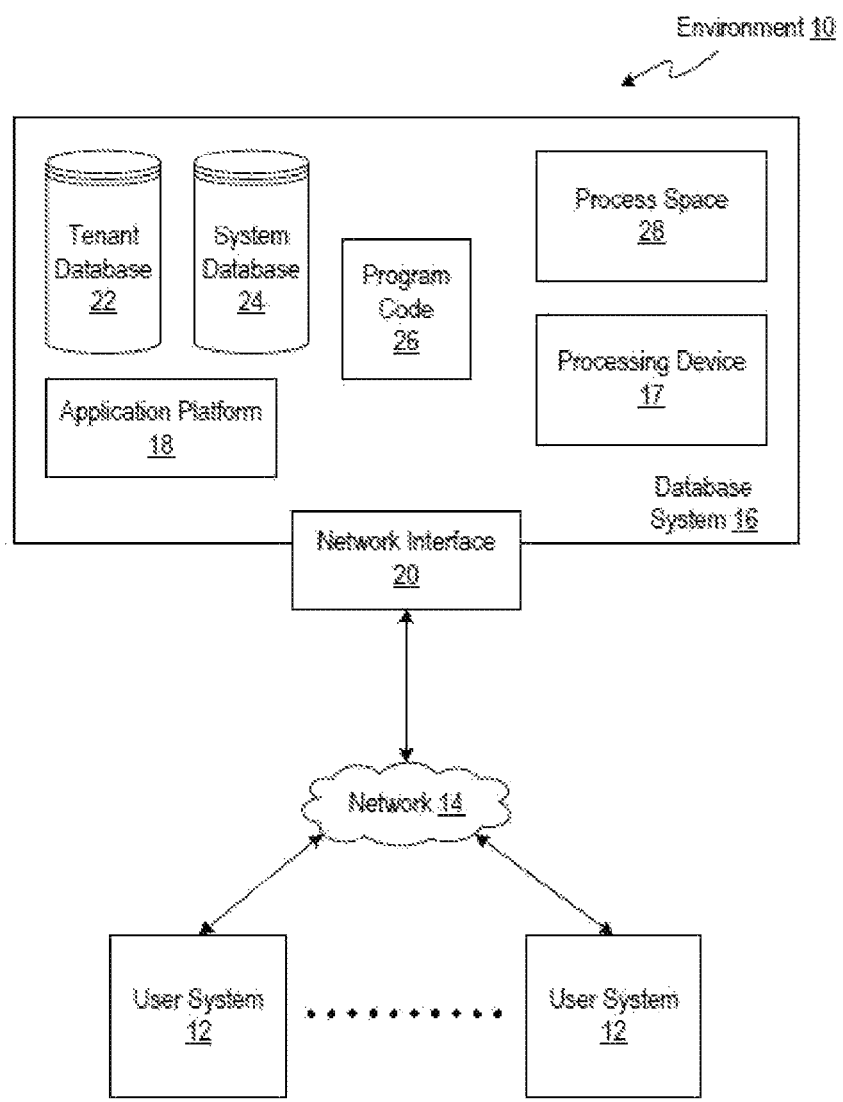
FIG. 1A illustrates an example computing environment in which an on-demand database service can be used according to some embodiments.

FIG. 1A illustrates a block diagram of an example of a cloud computing environment 10 in which an on-demand database service can be used in accordance with some implementations. Environment 10 includes user systems 12 (e.g., customer's computing systems), a network 14, a database system 16 (also referred to herein as a "cloud-based system" or a "cloud computing system"), a processing device 17, an application platform 18, a network interface 20, a tenant database 22 for storing tenant data, a system database 24 for storing system data, program code 26 for implementing various functions of the database system 16, and process space 28 for executing database system processes and tenant-specific processes, such as running applications for customers as part of an application hosting service. In some other implementations, environment 10 may not have all of these components or systems, or may have other components or systems instead of, or in addition to, those listed above.

In some implementations, environment 10 is a computing environment in which an on-demand database service exists. An on-demand database service, such as that which can be implemented using database system 16, is a service that is made available to users outside an enterprise (or enterprises) that owns, maintains, or provides access to database system 16. As described above, such users generally do not need to be concerned with building or maintaining database system 16. Instead, resources provided by database system 16 may be available for such users' use when the users need services provided by database system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a large number of customers, and a given database table may store rows of data for a potentially much larger number of customers. A database image can include one or more database objects. A relational database management system (RDBMS) or the equivalent can execute storage and retrieval of information against the database object(s).

Application platform 18 can be a framework that allows the applications of database system 16 to execute, such as the hardware or software infrastructure of database system 16. In some implementations, application platform 18 enables the creation, management and execution of one or more applications developed by the provider of the on-demand database service, users accessing the on-demand database service via user systems 12, or third-party application developers accessing the on-demand database service via user systems 12.

In some implementations, database system 16 implements a web-based customer relationship management (CRM) system. For example, in some such implementations, database system 16 includes application servers configured to implement and execute CRM software applications as well as provide related data, code, forms, renderable web pages, and documents and other information to and from user systems 12 and to store to, and retrieve from, a database system related data, objects, and World Wide Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. Database system 16 also implements applications other than, or in addition to, a CRM application. For example, database system 16 can provide tenant access to multiple hosted (standard and custom) applications, including a CRM application. User (or third-party developer) applications, which may or may not include CRM, may be supported by application platform 18. Application platform 18 manages the creation and storage of the applications into one or more database objects and the execution of the applications in one or more virtual machines in the process space of database system 16.

According to some implementations, each database system 16 is configured to provide web pages, forms, applications, data, and media content to user (client) systems 12 to support the access by user systems 12 as tenants of database system 16. As such, database system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application, such as an object-oriented database management system (OODBMS) or a relational database management system (RDBMS), as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

Network 14 can be or include any network or combination of networks of systems or devices that communicate with one another. For example, network 14 can be or include any one or any combination of a local area network (LAN), wide area network (WAN), telephone network, wireless network, cellular network, point-to-point network, star network, token ring network, hub network, or other appropriate configuration. Network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

User systems 12 (e.g., operated by customers) can communicate with database system 16 using TCP/IP and, at a higher network level, other common Internet protocols to communicate, such as the Hyper Text Transfer Protocol (HTTP), Hyper Text Transfer Protocol Secure (HTTPS), File Transfer Protocol (FTP), Apple File Service (AFS), Wireless Application Protocol (WAP), etc. In an example where HTTP is used, each user system 12 can include an HTTP client commonly referred to as a "web browser" or simply a "browser" for sending and receiving HTTP signals to and from an HTTP server of the database system 16. Such an HTTP server can be implemented as the sole network interface 20 between database system 16 and network 14, but other techniques can be used in addition to or instead of these techniques. In some implementations, network interface 20 between database system 16 and network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

User systems 12 can be implemented as any computing device(s) or other data processing apparatus or systems usable by users to access database system 16. For example, any of user systems 12 can be a desktop computer, a work station, a laptop computer, a tablet computer, a handheld computing device, a mobile cellular phone (for example, a "smartphone"), or any other Wi-Fi-enabled device, WAP-enabled device, or other computing device capable of interfacing directly or indirectly to the Internet or other network. When discussed in the context of a user, the terms "user system," "user device," and "user computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, Google's Chrome browser, or a WAP-enabled browser in the case of a cellular phone, personal digital assistant (PDA), or other wireless device, allowing a user (for example, a subscriber of on-demand services provided by database system 16) of user system 12 to access, process, and view information, pages, and applications available to it from database system 16 over network 14.

Each user system 12 also typically includes one or more user input devices, such as a keyboard, a mouse, a trackball, a touch pad, a touch screen, a pen or stylus, or the like, for interacting with a graphical user interface (GUI) provided by the browser on a display (for example, a monitor screen, liquid crystal display (LCD), light-emitting diode (LED) display, etc.) of user system 12 in conjunction with pages, forms, applications, and other information provided by database system 16 or other systems or servers. For example, the user interface device can be used to access data and applications hosted database system 16, and to perform searches on stored data, or otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with database system 16, that user system can have the capacities allotted to the salesperson. However, while an administrator is using that user system 12 to interact with database system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU), such as a Core® processor commercially available from Intel Corporation or the like. Similarly, database system 16 (and additional instances of an MTS, where more than one is present) and all of its components can be operator-configurable using application(s) including computer code to run using processing device 17, which may be implemented to include a CPU, which may include an Intel Core® processor or the like, or multiple CPUs. Each CPU may have multiple processing cores.

Database system 16 includes non-transitory computer-readable storage media having instructions stored thereon that are executable by or used to program a server or other computing system (or collection of such servers or computing systems) to perform some of the implementation of processes described herein. For example, program code 26 can include instructions for operating and configuring database system 16 to intercommunicate and to process web pages, applications, and other data and media content as described herein. In some implementations, program code 26 can be downloadable and stored on a hard disk, but the entire program code, or portions thereof, also can be stored in any other volatile or non-volatile memory medium or device as is well known, such as a read-only memory (ROM) or random-access memory (RAM), or provided on any media capable of storing program code, such as any type of rotating media including floppy disks, optical discs, digital video discs (DVDs), compact discs (CDs), micro-drives, magneto-optical discs, magnetic or optical cards, nanosystems (including molecular memory integrated circuits), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, virtual private network (VPN), local area network (LAN), etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VB_Script, and many other programming languages as are well known.

Figure 1B:
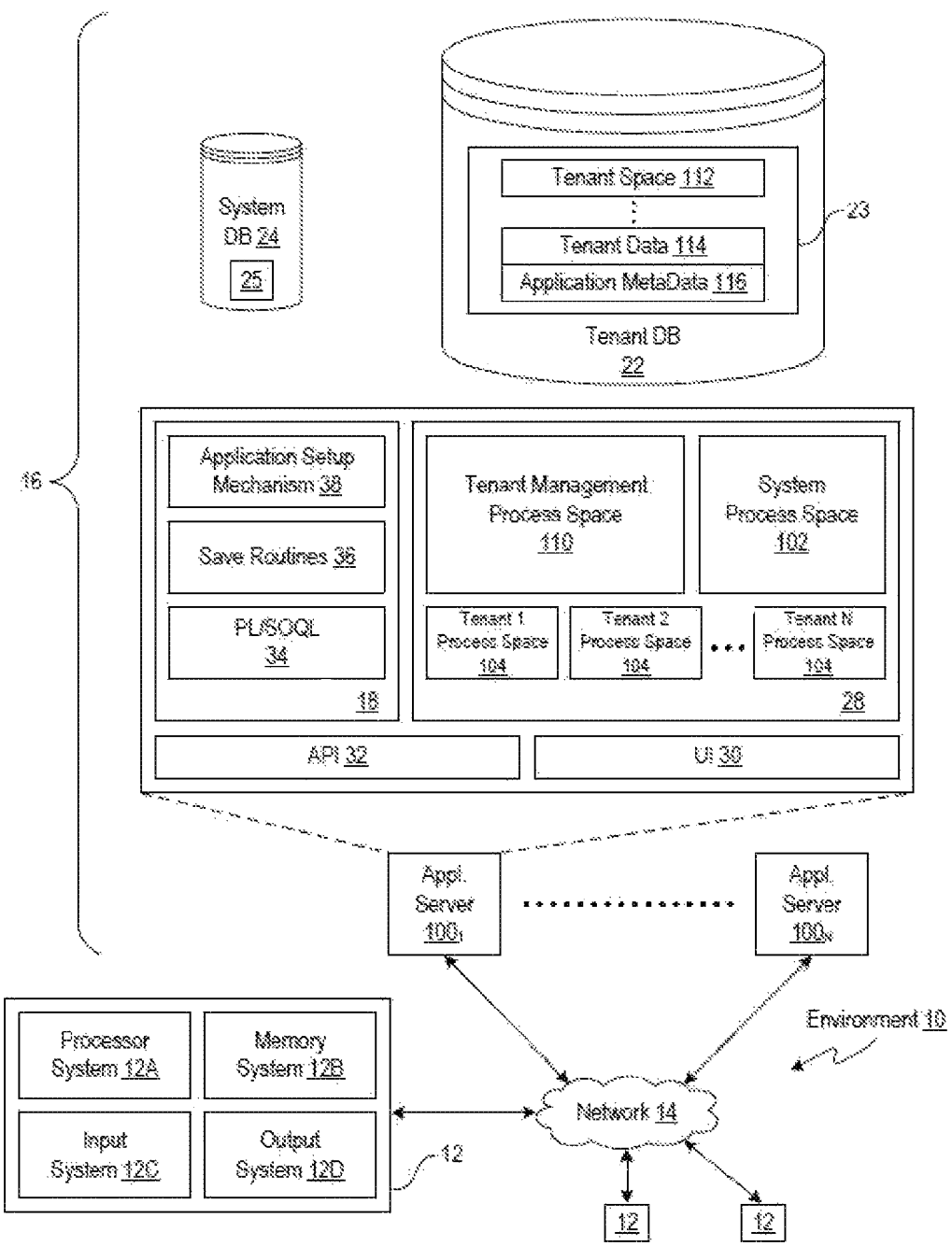
FIG. 1B illustrates example implementations of elements of FIG. 1A and example interconnections between these elements according to some embodiments.

FIG. 1B illustrates a block diagram of example implementations of elements of FIG. 1A and example interconnections between these elements according to some implementations. That is, FIG. 1B also illustrates environment 10, but in FIG. 1B, various elements of database system 16 and various interconnections between such elements are shown with more specificity according to some more specific implementations. In some implementations, database system 16 may not have the same elements as those described herein or may have other elements instead of, or in addition to, those described herein.

In FIG. 1B, user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, network interface 20 is implemented as a set of HTTP application servers $100_1$-$100_N$. Each application server 100, also referred to herein as an "app server," is configured to communicate with tenant database 22 and tenant data 23 stored therein, as well as system database 24 and system data 25 stored therein, to serve requests received from user systems 12. Tenant data 23 can be divided into individual tenant storage spaces 112, which can be physically or logically arranged or divided. Within each tenant storage space 112, tenant data 114 and application metadata 116 can similarly be allocated for each user. For example, a copy of a user's most recently used (MRU) items can be stored in tenant data 114. Similarly, a copy of MRU items for an entire organization that is a tenant can be stored to tenant space 112.

Database system 16 of FIG. 1B also includes a user interface (UI) 30 and an application programming interface (API) 32. Process space 28 includes system process space 102, individual tenant process spaces 104 and a tenant management process space 110. Application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process space 110, for example. Invocations to such applications can be coded using procedural language for structured query language (PL/SQL) 34, which provides a programming language style interface extension to the API 32. A detailed description of some PL/SQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, issued on Jun. 1, 2010, and hereby incorporated by reference herein in its entirety and for all purposes. Invocations to applications can be detected by one or more system processes, which manage retrieving application metadata 116 for the subscriber making the invocation and executing the metadata as an application in a virtual machine.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_2$ can be coupled via a direct network link, and another application server $100_N$ can be coupled by yet a different network connection. Transfer Control Protocol and Internet Protocol (TCP/IP) are examples of typical protocols that can be used for communicating between application servers 100 and database system 16. However, it will be apparent to one skilled in the art that other transport protocols can be used to optimize database system 16 depending on the network interconnections used.

In some implementations, each application server 100 is configured to handle requests for any user associated with any organization that is a tenant of database system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between application servers 100 and user systems 12 to distribute requests to application servers 100. In one implementation, the load balancer uses a least-connections algorithm to route user requests to application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, database system 16 can be a multi-tenant system in which database system 16 handles storage of, and access to, different objects, data, and applications across disparate users and organizations.

In one example storage use case, one tenant can be a company that employs a sales force where each salesperson uses database system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed at database system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, database system 16 also can maintain system level data usable by multiple tenants or other data. Such system level data can include industry reports, news, postings, and the like that are sharable among tenants.

In some implementations, user systems 12 (which also can be client systems) communicate with application servers 100 to request and update system-level and tenant-level data from database system 16. Such requests and updates can involve sending one or more queries to tenant database 22 or system database 24. Database system 16 (for example, an application server 100 in database system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, issued on Aug. 17, 2010, and hereby incorporated by reference herein in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
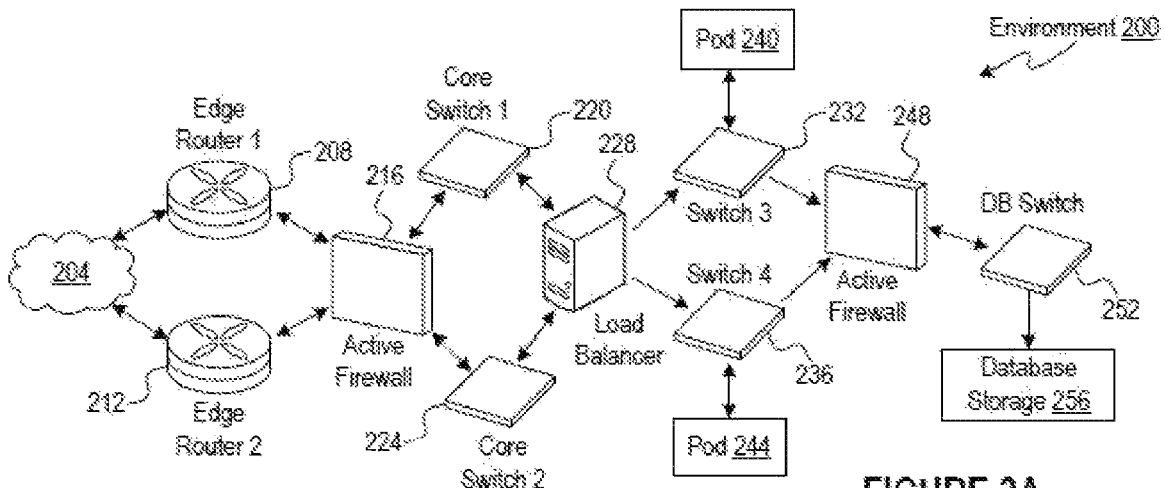
FIG. 2A illustrates example architectural components of an on-demand database service environment according to some embodiments.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. Pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
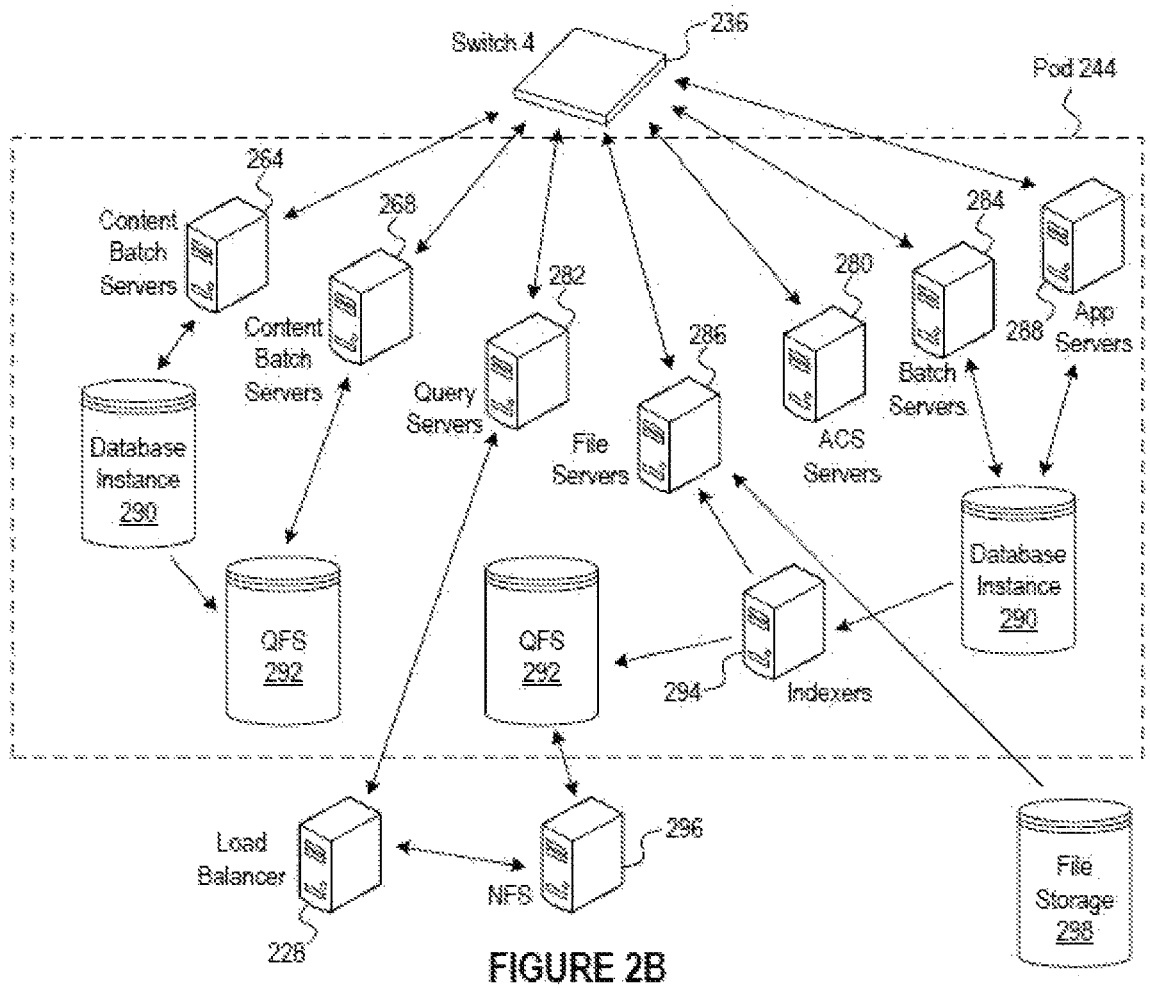
FIG. 2B illustrates example architectural components of an on-demand database service environment according to some embodiments.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to many devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server," "device," and "processing device" as used herein are not limited to a single hardware device; rather, references to these terms can include any suitable combination of hardware and software configured to provide the described functionality.

Cloud 204 is intended to refer to a data network or multiple data networks, often including the Internet. Client machines communicably connected with cloud 204 can communicate with other components of the on-demand database service environment 200 to access services provided by the on-demand database service environment. For example, client machines can access the on-demand database service environment to retrieve, store, edit, or process information. In some implementations, edge routers 208 and 212 route packets between cloud 204 and other components of the on-demand database service environment 200. For example, edge routers 208 and 212 can employ the Border Gateway Protocol (BGP). The BGP is the core routing protocol of the Internet. Edge routers 208 and 212 can maintain a table of Internet Protocol (IP) networks or 'prefixes,' which designate network reachability among autonomous systems on the Internet.

In some implementations, firewall 216 can protect the inner components of the on-demand database service environment 200 from Internet traffic. Firewall 216 can block, permit, or deny access to the inner components of on-demand database service environment 200 based upon a set of rules and other criteria. Firewall 216 can act as one or more of a packet filter, an application gateway, a stateful filter, a proxy server, or any other type of firewall.

In some implementations, core switches 220 and 224 are high-capacity switches that transfer packets within the on-demand database service environment 200. Core switches 220 and 224 can be configured as network bridges that quickly route data between different components within the on-demand database service environment. In some implementations, the use of two or more core switches 220 and 224 can provide redundancy or reduced latency.

In some implementations, pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between pods 240 and 244 is conducted via pod switches 232 and 236. Pod switches 232 and 236 can facilitate communication between pods 240 and 244 and client machines communicably connected with cloud 204, for example, via core switches 220 and 224. Also, pod switches 232 and 236 may facilitate communication between pods 240 and 244 and database storage 256. In some implementations, load balancer 228 can distribute workload between pods 240 and 244. Balancing the on-demand service requests between the pods can assist in improving the use of resources, increasing throughput, reducing response times, or reducing overhead. Load balancer 228 may include multilayer switches to analyze and forward traffic.

In some implementations, access to database storage 256 is guarded by a database firewall 248. Database firewall 248 can act as a computer application firewall operating at the database application layer of a protocol stack. Database firewall 248 can protect database storage 256 from application attacks such as SQL injection, database rootkits, and unauthorized information disclosure. In some implementations, database firewall 248 includes a host using one or more forms of reverse proxy services to proxy traffic before passing it to a gateway router. Database firewall 248 can inspect the contents of database traffic and block certain content or database requests. Database firewall 248 can work on the SQL application level atop the TCP/IP stack, managing applications' connection to the database or SQL management interfaces as well as intercepting and enforcing packets traveling to or from a database network or application interface.

In some implementations, communication with database storage 256 is conducted via database switch 252. Multi-tenant database storage 256 can include more than one hardware or software components for handling database queries. Accordingly, database switch 252 can direct database queries transmitted by other components of the on-demand database service environment (for example, pods 240 and 244) to the correct components within database storage 256. In some implementations, database storage 256 is an on-demand database system shared by many different organizations as described above with reference to FIGS. 1A and 1B.

FIG. 2B shows a system diagram further illustrating example architectural components of an on-demand database service environment according to some implementations. Pod 244 can be used to render services to a user of on-demand database service environment 200. In some implementations, each pod includes a variety of servers or other systems. Pod 244 includes one or more content batch servers 264, content search servers 268, query servers 282, file servers 286, access control system (ACS) servers 280, batch servers 284, and app servers 288. Pod 244 also can include database instances 290, quick file systems (QFS) 292, and indexers 294. In some implementations, some or all communication between the servers in pod 244 can be transmitted via pod switch 236.

In some implementations, app servers 288 include a hardware or software framework dedicated to the execution of procedures (for example, programs, routines, scripts) for supporting the construction of applications provided by on-demand database service environment 200 via pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

Content batch servers 264 can handle requests internal to the pod. Some such requests can be long-running or not tied to a particular customer. For example, content batch servers 264 can handle requests related to log mining, cleanup work, and maintenance tasks. Content search servers 268 can provide query and indexer functions. For example, the functions provided by content search servers 268 can allow users to search through content stored in the on-demand database service environment. File servers 286 can manage requests for information stored in file storage 298. File storage 298 can store information such as documents, images, and binary large objects (BLOBs). By managing requests for information using file servers 286, the image footprint on the database can be reduced. Query servers 282 can be used to retrieve information from one or more file systems. For example, query servers 282 can receive requests for information from app servers 288 and transmit information queries to network file systems (NFS) 296 located outside the pod.

Pod 244 can share a database instance 290 configured as a multi-tenant environment in which different organizations share access to the same database. Additionally, services rendered by pod 244 may call upon various hardware or software resources. In some implementations, ACS servers 280 control access to data, hardware resources, or software resources. In some implementations, batch servers 284 process batch jobs, which are used to run tasks at specified times. For example, batch servers 284 can transmit instructions to other servers, such as app servers 288, to trigger the batch jobs.

In some implementations, QFS 292 is an open source file system available from Sun Microsystems, Inc. The QFS can serve as a rapid-access file system for storing and accessing information available within the pod 244. QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in NFS 296 or other storage systems.

In some implementations, one or more query servers 282 communicate with the NFS 296 to retrieve or update information stored outside of the pod 244. NFS 296 can allow servers located in pod 244 to access information to access files over a network in a manner similar to how local storage is accessed. In some implementations, queries from query servers 282 are transmitted to NFS 296 via load balancer 228, which can distribute resource requests over various resources available in the on-demand database service environment. NFS 296 also can communicate with QFS 292 to update the information stored on NFS 296 or to provide information to QFS 292 for use by servers located within pod 244.

In some implementations, the pod includes one or more database instances 290. Database instance 290 can transmit information to QFS 292. When information is transmitted to the QFS, it can be available for use by servers within pod 244 without using an additional database call. In some implementations, database information is transmitted to indexer 294. Indexer 294 can provide an index of information available in database instance 290 or QFS 292. The index information can be provided to file servers 286 or QFS 292.

Figure 3:
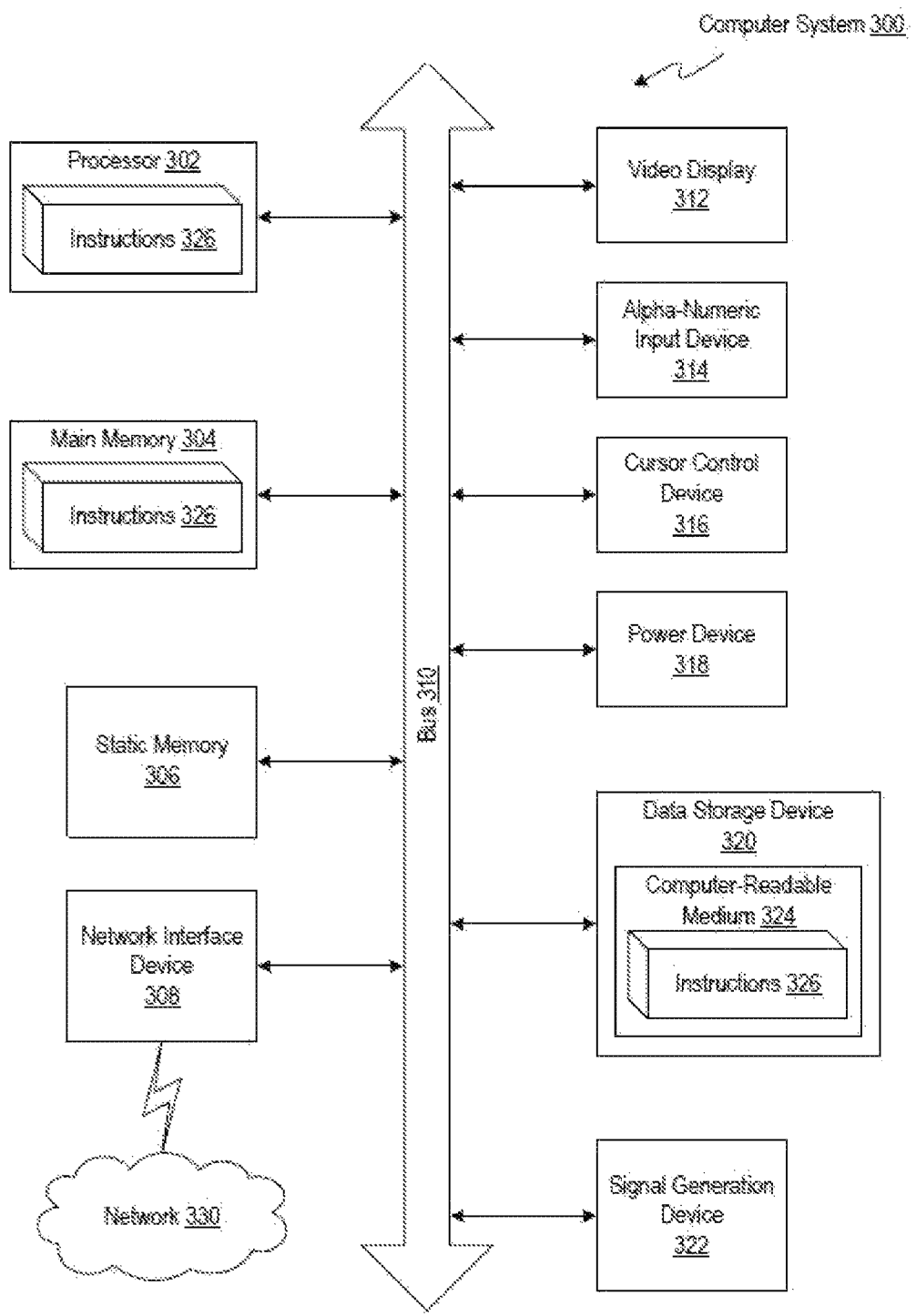
FIG. 3 is a diagrammatic representation of a machine in the exemplary form of a computer system within which one or more embodiments may be carried out.

FIG. 3 illustrates a diagrammatic representation of a machine in the exemplary form of a computer system 300 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 300 may be utilized by or illustrative of any of the electronic components described herein (e.g., any of the components illustrated in or described with respect to FIGS. 1A, 1B, 2A, and 2B).

The exemplary computer system 300 includes a processing device (processor) 302, a main memory 304 (e.g., ROM, flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 320, which communicate with each other via a bus 310.

Processor 302 represents one or more general-purpose processing devices such as a microprocessor, central processing unit, or the like. More particularly, processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 302 may also be one or more special-purpose processing devices such as an application specific integrated circuit (ASIC), a field programmable gate array (FPGA), a digital signal processor (DSP), network processor, or the like. Processor 302 is configured to execute instructions 326 for performing the operations and steps discussed herein. Processor 302 may have one or more processing cores.

Computer system 300 may further include a network interface device 308. Computer system 300 also may include a video display unit 312 (e.g., a liquid crystal display (LCD), a cathode ray tube (CRT), or a touch screen), an alphanumeric input device 314 (e.g., a keyboard), a cursor control device 316 (e.g., a mouse or touch screen), and a signal generation device 322 (e.g., a loud speaker).

Power device 318 may monitor a power level of a battery used to power computer system 300 or one or more of its components. Power device 318 may provide one or more interfaces to provide an indication of a power level, a time window remaining prior to shutdown of computer system 300 or one or more of its components, a power consumption rate, an indicator of whether computer system is utilizing an external power source or battery power, and other power related information. In some implementations, indications related to power device 318 may be accessible remotely (e.g., accessible to a remote back-up management module via a network connection). In some implementations, a battery utilized by power device 318 may be an uninterruptable power supply (UPS) local to or remote from computer system 300. In such implementations, power device 318 may provide information about a power level of the UPS.

Data storage device 320 may include a computer-readable storage medium 324 (e.g., a non-transitory computer-readable storage medium) on which is stored one or more sets of instructions 326 (e.g., software) embodying any one or more of the methodologies or functions described herein. Instructions 326 may also reside, completely or at least partially, within main memory 304 and/or within processor 302 during execution thereof by computer system 300, main memory 304, and processor 302 also constituting computer-readable storage media. Instructions 326 may further be transmitted or received over a network 330 (e.g., network 14) via network interface device 308.

In one implementation, instructions 326 include instructions for performing any of the implementations described herein. While computer-readable storage medium 324 is shown in an exemplary implementation to be a single medium, it is to be understood that computer-readable storage medium 324 may include a single medium or multiple media (e.g., a centralized or distributed database, and/or associated caches and servers) that store the one or more sets of instructions.

Continuous integration (CI) and continuous delivery (CD) embody a set of operating principles and collection of practices that enable application development teams to deliver code changes more frequently and reliably. CI is a coding philosophy and set of practices that drive application development teams to implement small changes and check in code to version control repositories frequently. Because most modern applications (e.g., application platform 18 and/or program code 26) require developing code in different platforms and tools, the application development team needs a mechanism to integrate and validate its changes. A goal of CI is to establish a consistent and automated way to build, package, and test applications. With consistency in the integration process in place, teams are more likely to commit code changes more frequently, which leads to better collaboration and software quality. CD picks up where continuous integration ends. CD automates the delivery of applications to selected infrastructure environments. Application development teams work often with multiple environments other than the production, such as development and testing environments, and CD ensures there is an automated way to push code changes to them. CI/CD requires continuous testing because the objective is to deliver quality applications and code to users. Continuous testing is often implemented as a set of automated regression, performance, and other tests that are executed in the CI/CD pipeline. A CI/CD practice may implement CD where application changes run through the CI/CD pipeline and builds are deployed directly to production environments. Application development teams practicing CD may frequently deploy application components to production (e.g., on a daily or even hourly schedule).

Thus, in a CI process in a cloud computing environment 10, application development teams need to quickly build and deploy trusted applications 18 and/or updated information to the cloud. Cloud computing resources available to end-users may be based on at least several individual software components, such as applications and infrastructure software. As the cloud computing environment 10 grows and matures, there is need to support a variety of different software applications (including different versions) from development to production. This includes application level software (deployed as packaged applications from simple tarballs to docker images) and infrastructure software (e.g., configuration packages such as release package managers (RPMs), operating system (OS) and database (DB) (OS/DB) images, and so on). One purpose of a cloud computing environment is to provide a scalable, fault-tolerant, performant and secure pipeline to move files representing software applications and/or information to production application host computing systems (e.g., pods 240 and 244, database system 16) accessible by end-users in a cloud computing environment network topology.

In typical scenarios, a file used by a CI/CD process is called an artifact. In some embodiments, an artifact is the output of a CI process. For example, an artifact may represent one or more components of a version of a software application. In another example, an artifact may represent information (e.g., data) that a software application in the cloud computing environment communicates to one or more end-users or to another software application.

As used herein, an artifact is an opaque file with some metadata associated with it. In embodiments, the artifact is to be distributed in the cloud computing environment. In various examples, an artifact is a binary file (e.g., compiled application, OS component, DB system component, docker, code image, zip file, compressed file, etc.) or a configuration file (e.g., a text file such as a YAML Ain't Markup language (YAW) describing a manifest or a network configuration file, etc.). An artifact nay also be a data file containing text data, image data, audio data, video data, audio data, multimedia data, DB data, or other data in any format. Furthermore, the artifact may be of any size (e.g., from the low kilobytes (KBs) to many gigabytes (GBs). As used herein, computing systems and/or processes used to distribute the artifact in the cloud computing environment have no understanding of the contents of the artifact but merely the delivery destination (e.g., where the artifact needs to be delivered in the cloud computing environment network, but not what is inside).

Since an artifact can be of a large size, distribution of the artifact across the cloud computing environment may result in network inefficiencies and poor system performance. Accordingly, an artifact may be divided into smaller portions of a predetermined size, called "chunks" herein, to allow the cloud computing environment to more efficiently distribute the artifact (e.g., via the constituent chunks). The original artifact can then be reconstructed by a concatenation of the artifact's chunks.

Figure 4:
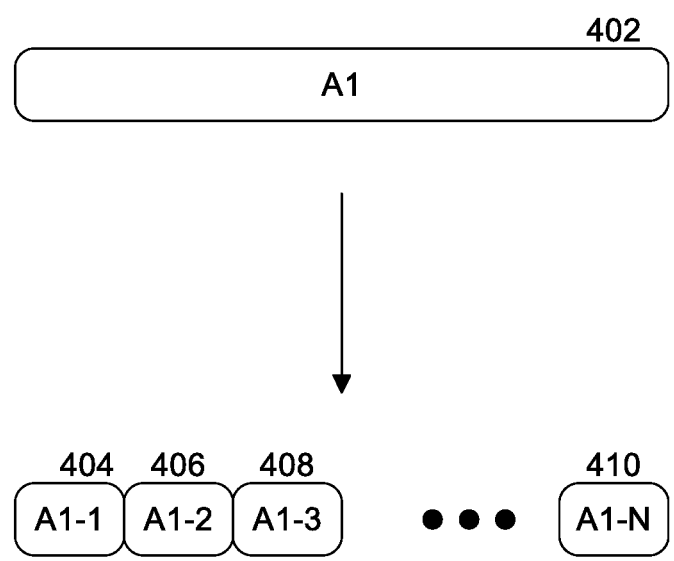
FIG. 4 illustrates an example artifact split into multiple chunks.

FIG. 4 illustrates an example artifact split into multiple chunks. In this simple example, artifact A1 402 is split up into multiple chunks A1-1 404, A1-2 406, A1-3 408, . . . A1-N 410 as shown. In an embodiment, whether an artifact will be split into chunks during distribution can be controlled by annotating the artifact appropriately. In an embodiment, every chunk has a globally unique chunk_id which can be used to identify the chunk. The chunk can store data as well as a digital signature which can be used to validate the integrity of the chunk.

Figure 5:
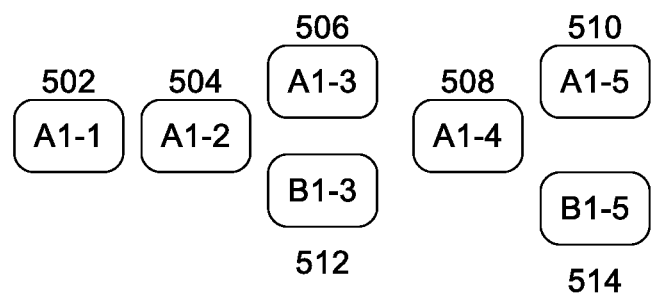
FIG. 5 illustrates an example artifact stream.

A way to visualize an artifact is as a concatenation of streamed chunks. In some cases, multiple streams may share a chunk. In this case, to optimize delivery in some embodiments chunks in common with multiple artifacts are delivered across the cloud computing environment with only one copy (instead of multiple copies of the commonly used chunk). FIG. 5 illustrates an example artifact stream. Here, two artifacts A1 516 and B1 518 share common chunks A1-1 502, A1-2 504 and A1-4 508. Chunks A1-3 506 and A1-5 510 are unique to artifact A1 516. Chunks B1-3 512 and B1-5 514 are unique to artifact B1 518. Therefore, during a synchronization operation or a last-mile delivery operation (both of which are described below) if A1 was already delivered across the cloud computing environment, only chunks B1-3 512 and B1-5 514 need to be delivered to a destination in order to deliver the complete artifact B1 518.

Figure 6:
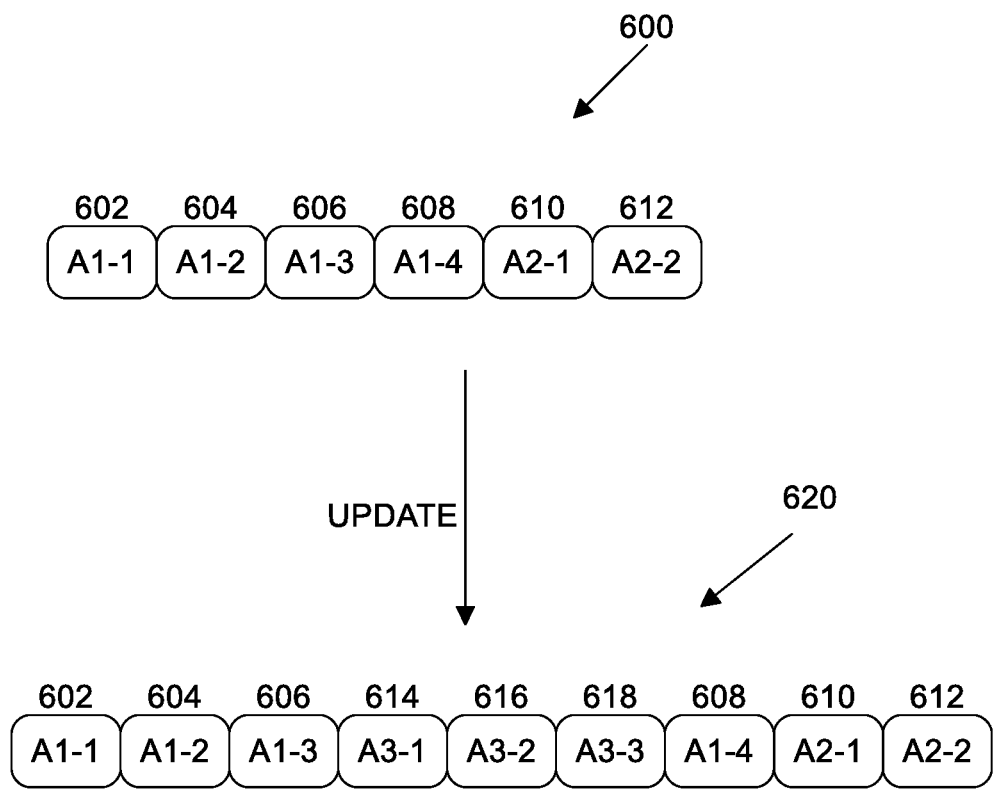
FIG. 6 illustrates an example priority queue for artifact chunks.

In some embodiments a priority queue for managing distribution of artifacts is maintained and delivered across the cloud computing environment. The priority queue includes a list of chunks and is used to determine which chunk will be next synchronized by an artifact delivery destination. FIG. 6 illustrates an example priority queue for artifact chunks. In this example, original priority queue 600 includes artifact A1 including chunks A1-1 602, A1-2 604, A1-3 606, and A1-4 608, and artifact A2 including chunks A2-1 610 and A2-2 612. In this example, chunks of artifact A1 have a higher priority for distribution than chunks of artifact A2. Further to this example, an artifact A3 is then received, with chunks of artifact A3 having a higher priority than chunks of artifact A2 and chunk A1-4 608 of artifact A1, but a lower priority than chunks A1-1, A1-2, and A1-3 of artifact A1. Thus, the priority queue may be updated by inserting chunks A3-1 614, A3-2 616 and A3-3 618 as shown (e.g., between chunk A1-3 606 and A1-4 608). This enables the following capabilities. Chunks for an artifact can be inserted in the appropriate position in the priority queue based on each chunk's priority in order to reorder subsequent distribution of chunks. When higher priority chunks of a new artifact are inserted into the priority queue, these higher priority chunks are distributed first, thereby possibly suspending the distribution of lower priority chunks of the original artifact. The original artifact distribution resumes as soon as the higher priority chunks are delivered. Starvation of smaller artifacts behind larger artifacts can be deterred by ensuring that some portion of the priority queue is dedicated to chunks of all priorities. That is, smaller artifacts (e.g., of a size in KBs to a small number of megabytes (MBs)) can be given higher priority than large (e.g., multi-GB) artifacts as appropriate.

In an embodiment, the cloud computing environment 200 is arranged in a network of multiple computing systems. The network of computing systems may include computing systems at any location worldwide. In the network topology, a first computing system (e.g., any of the servers shown in FIG. 2), called an upstream computing system, may be physically or communicatively "closer" to the source of an artifact. The source of the artifact is a computing system in the cloud computing environment 200 that generates the artifact for subsequent distribution. In an embodiment, the source of the artifact is a CI or CD process of the upstream computing system. The upstream computing system communicates with a second computing system (e.g., any of the servers shown in FIG. 2), called a downstream computing system, which may be physically or communicatively "farther away" (in the sense of the network topology) than the upstream computing system. Generally, in embodiments a downstream computing system gets an artifact from an upstream computing system. Once a downstream computing system has an artifact, the downstream computing system can act as an upstream computing system to another downstream computing system in the network that requests the artifact. Thus, computing systems in the cloud computing environment can be both upstream computing systems and downstream computing systems depending on their current role in the distribution of the current artifact.

Figure 7:
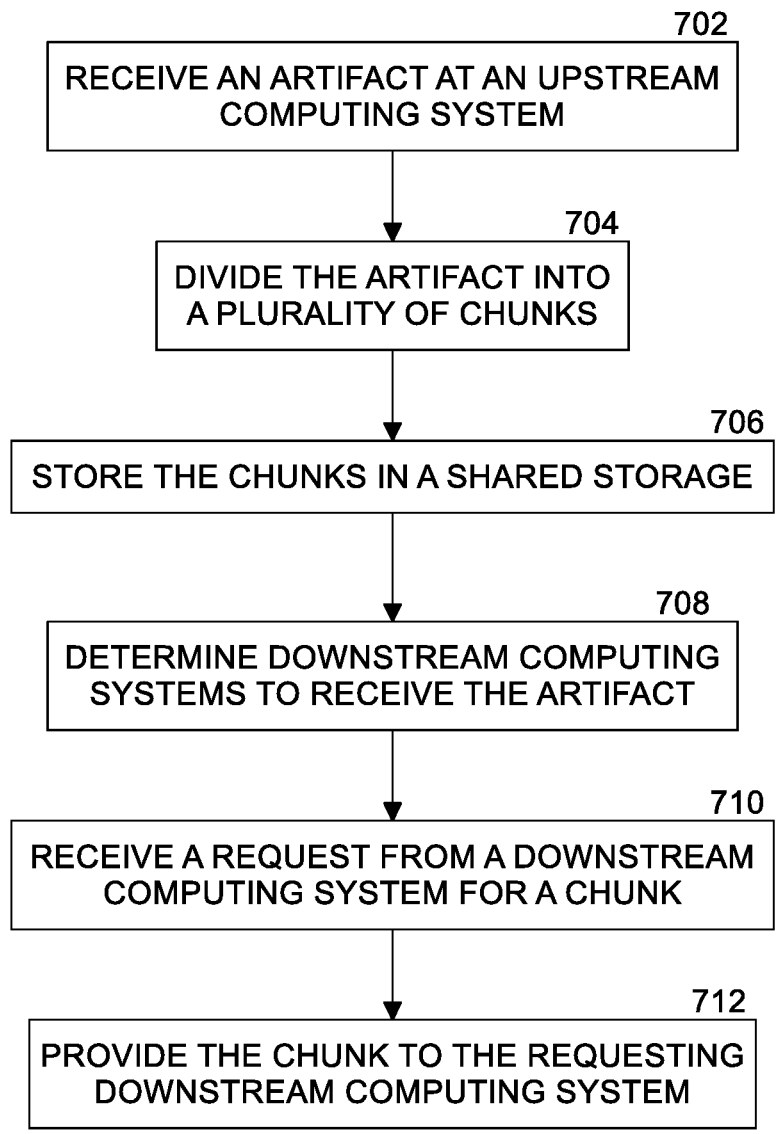
FIG. 7 is a flow diagram of distributing an artifact in a cloud computing environment according to some embodiments.

FIG. 7 is a flow diagram 700 of distributing an artifact in a cloud computing environment according to some embodiments. At block 702, an upstream computing system receives an artifact. In an embodiment, the artifact is a file of a CI or CD process. In an embodiment, a CI or CD process of the upstream computing system generates the artifact. In another embodiment, the computing system receives the artifact from another computing system, thus becoming a logical "upstream" computing system. At block 704, the upstream computing system divides the artifact into a plurality of chunks. At block 706, the upstream computing system stores the chunks in a shared storage (e.g., system database 24 of FIG. 1 or file storage 298 of FIG. 2) in the cloud computing environment. At block 708, the upstream computing system determines the downstream computing systems in the network to receive the artifact. At block 710, the upstream computing system receives a request from a downstream computing system for a chunk of the artifact. If the downstream computing system is to receive the artifact, the upstream computing system at block 712 sends the chunk to the requesting downstream computing system. The processing described in FIG. 7 can be repeated for multiple chunks (e.g., all chunks in some cases) of the artifact, for multiple artifacts, and for multiple downstream computing systems. Thus, chunks of artifacts are efficiently distributed across the network of computing systems in the cloud computing environment.

Figure 8:
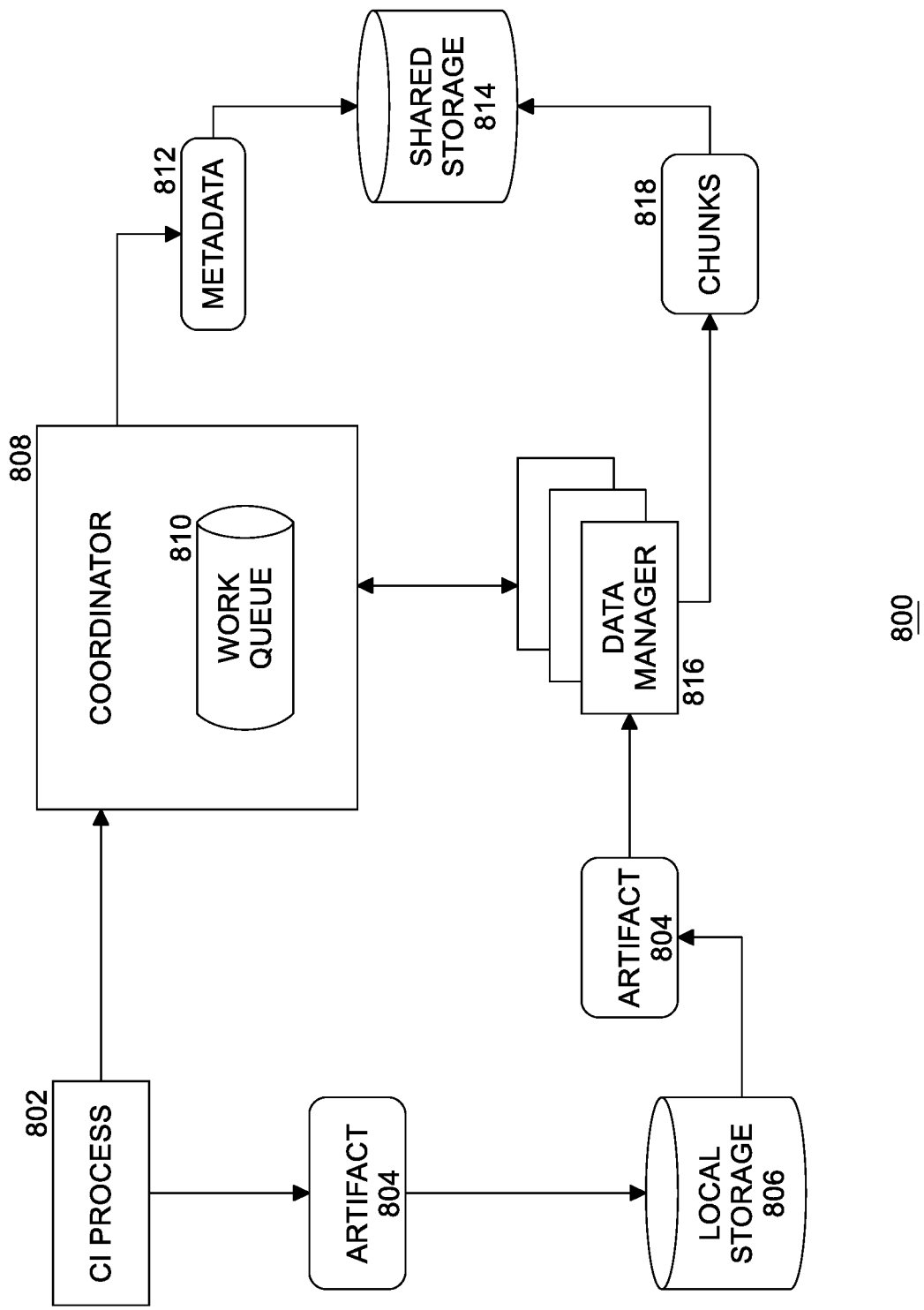
FIG. 8 illustrates a system for receiving an artifact for distribution according to some embodiments.

FIG. 8 illustrates a system 800 for receiving an artifact for distribution according to some embodiments. In an embodiment, system 800 is an upstream computing system as described above in FIG. 7. CI process 802 generates an artifact 804 stored on a local CI storage node. In an embodiment, CI process 802 is part of upstream computing system 800. In another embodiment, CI process 802 is executed by a computing system other than upstream computing system 800 and communicates artifact 804 to upstream computing system 800. CI process 802 stores artifact 804 into local storage 806 or causes artifact 804 to be stored in local storage 806 and notifies coordinator 808 that a new artifact is available for downstream distribution.

In embodiments, coordinator 808 is an active agent in upstream computing system 800 responsible for maintaining dynamic information about which chunks are being requested and distributed and for continually adjusting the priority of delivery of chunks being requested. In addition, in an embodiment coordinator 808 fields requests from downstream computing systems which need to be notified when selected artifacts (or class of artifacts) are available for distribution. Coordinator 808 generates metadata 812 describing an artifact. In an embodiment, metadata 812 includes a source identifier (ID) (e.g., the computing system generating the artifact), a chunk list for the artifact, a time stamp, and any other appropriate artifact-specific metadata (such as digital signatures, checksums, distribution criteria, priority, artifact specific tags, etc.). Coordinator 808 includes at least one work queue 810 (e.g., a priority queue as discussed above) to store information about distribution of artifacts and chunks. Coordinator 808 adds artifact 804 to the work queue. Coordinator 808 stores metadata 812 about chunks and artifacts in shared storage 814. Based at least in part on communication with coordinator 808, at least one of a plurality of data managers 816 polls work queue 810 in coordinator 808, retrieves artifact 804 from local storage 806 (e.g., storage only accessible by CI process or upstream computing system 800). Data manager 816 divides the artifact in chunks 818 and stores the chunks into shared storage 814. Chunks 818 are then ready to be sent to a downstream computing system in response to a request for distribution.

Shared storage 814 is a scalable fault-tolerant data storage layer in the cloud computing environment (such as Storage Cloud's Ceph-based blob storage in one embodiment) used to store chunks as well as other static data such as artifact metadata and a chunk list. In this way, coordinator 808 need only send notifications of available artifacts to synchronize while the storage layer independently scales to satisfy incoming requests for synchronizing chunks and metadata across computing systems of the cloud computing environment.

Figure 9:
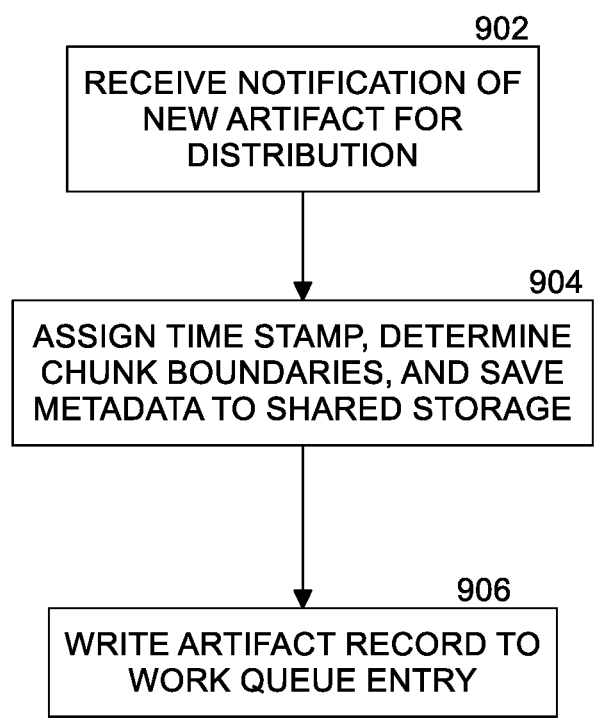
FIG. 9 is a flow diagram of receiving an artifact for distribution by a coordinator according to some embodiments.

FIG. 9 is a flow diagram 900 of receiving an artifact for distribution by a coordinator according to some embodiments. At block 902, coordinator 808 receives a notification of a new artifact for distribution. In an embodiment, the notification is received from CI process 802. At block 904, coordinator 808 assigns a time stamp, determines chunk boundaries, and saves metadata 812 to shared storage 814. At block 906, coordinator 808 writes an artifact record to a new entry in work queue 810.

Figure 10:
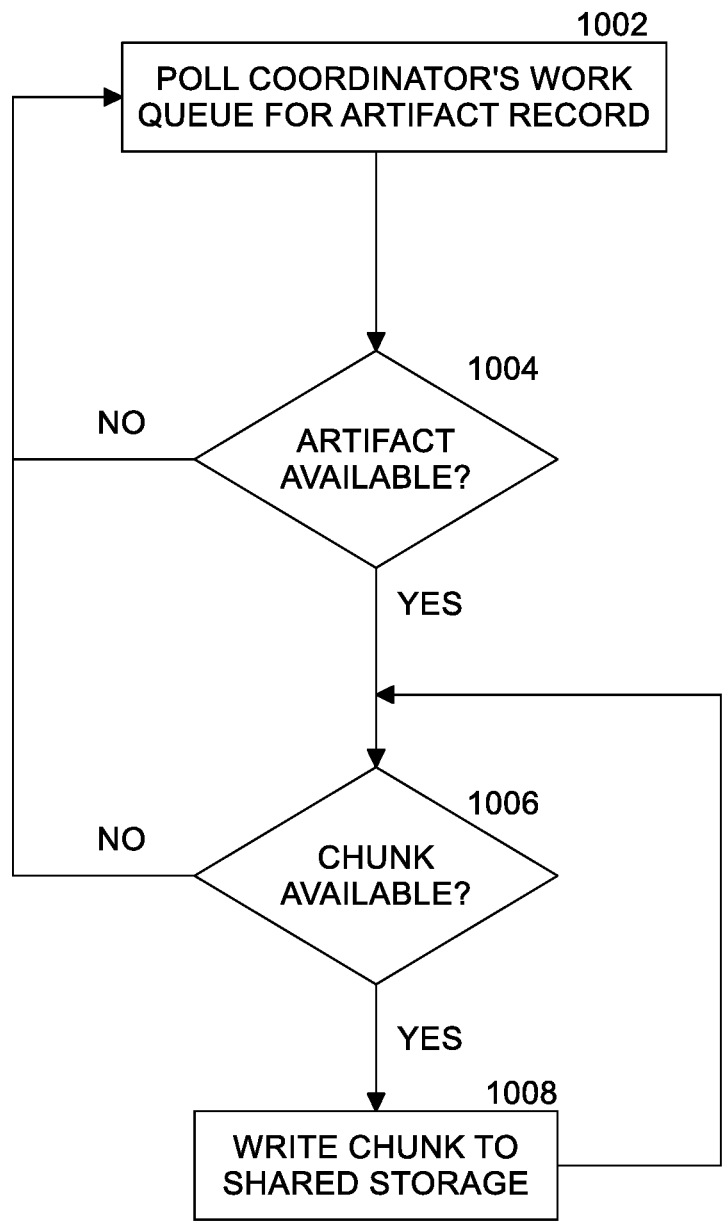
FIG. 10 is a flow diagram of receiving an artifact by a data manager according to some embodiments.

FIG. 10 is a flow diagram 1000 of receiving an artifact by a data manager according to some embodiments. At block 1002, data manager 816 polls the coordinator's work queue 810 for entry of an artifact record of a new artifact. At block 1004, if an artifact is available for distribution, data manager 816 determines if a chunk of the artifact is available for distribution. At block 1006, if a chunk of the artifact is available for distribution, data manager 816 writes the chunk 818 to shared storage 814 at block 1008. If at block 1004 no new artifact is available, data manager 816 returns to block 1002 for continued polling. If at block 1006 no new chunk is available, data manager 816 returns to block 1002 for continued polling. Block 1008 is performed for all chunks of all available artifacts.

Figure 11:
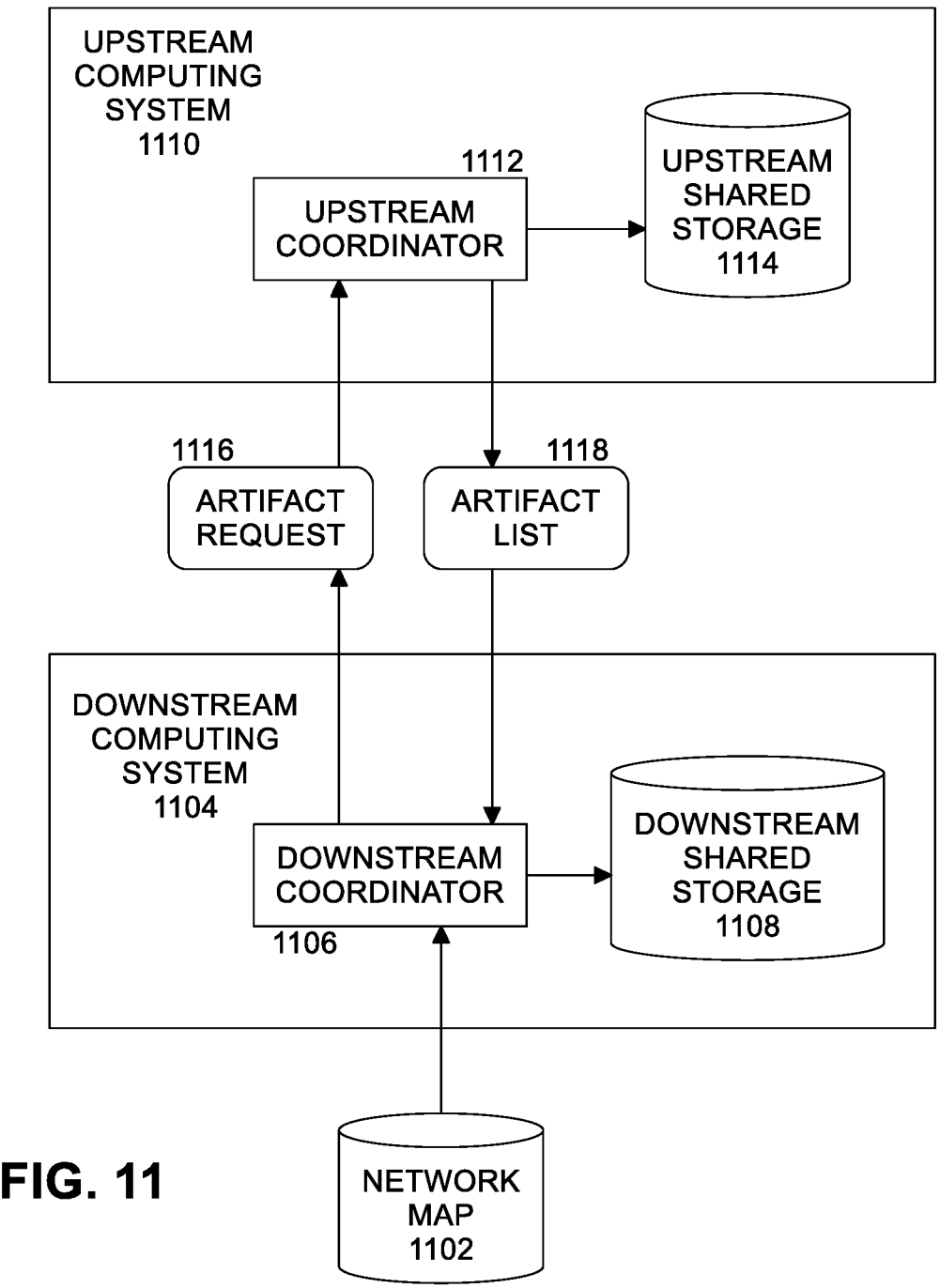
FIG. 11 illustrates a system for determining synchronization of artifacts according to some embodiments.

Once a new artifact is stored in shared storage 814, the artifact is ready to be distributed to requesting downstream computing systems. FIG. 11 illustrates a system for determining synchronization of artifacts according to some embodiments. Upstream computing system 1110 includes upstream coordinator 1112 (e.g., performing the processing of coordinator 808) and a list of downstream (relative to upstream computing system 1110) computing systems 1114 coupled to upstream computing system 1110. Similarly, downstream computing system 1104 includes downstream coordinator 1106 and a list of downstream (relative to downstream computing system 1104) computing systems 1108 coupled with downstream computing system 1104. In an embodiment, downstream coordinator 1106 loads network map 1102 of the cloud computing environment network topology. Downstream coordinator 1106 sends an artifact request 1116 to upstream coordinator 1112. In response, upstream coordinator 1112 returns artifact list 1118 to downstream coordinator 1118.

Figure 12:
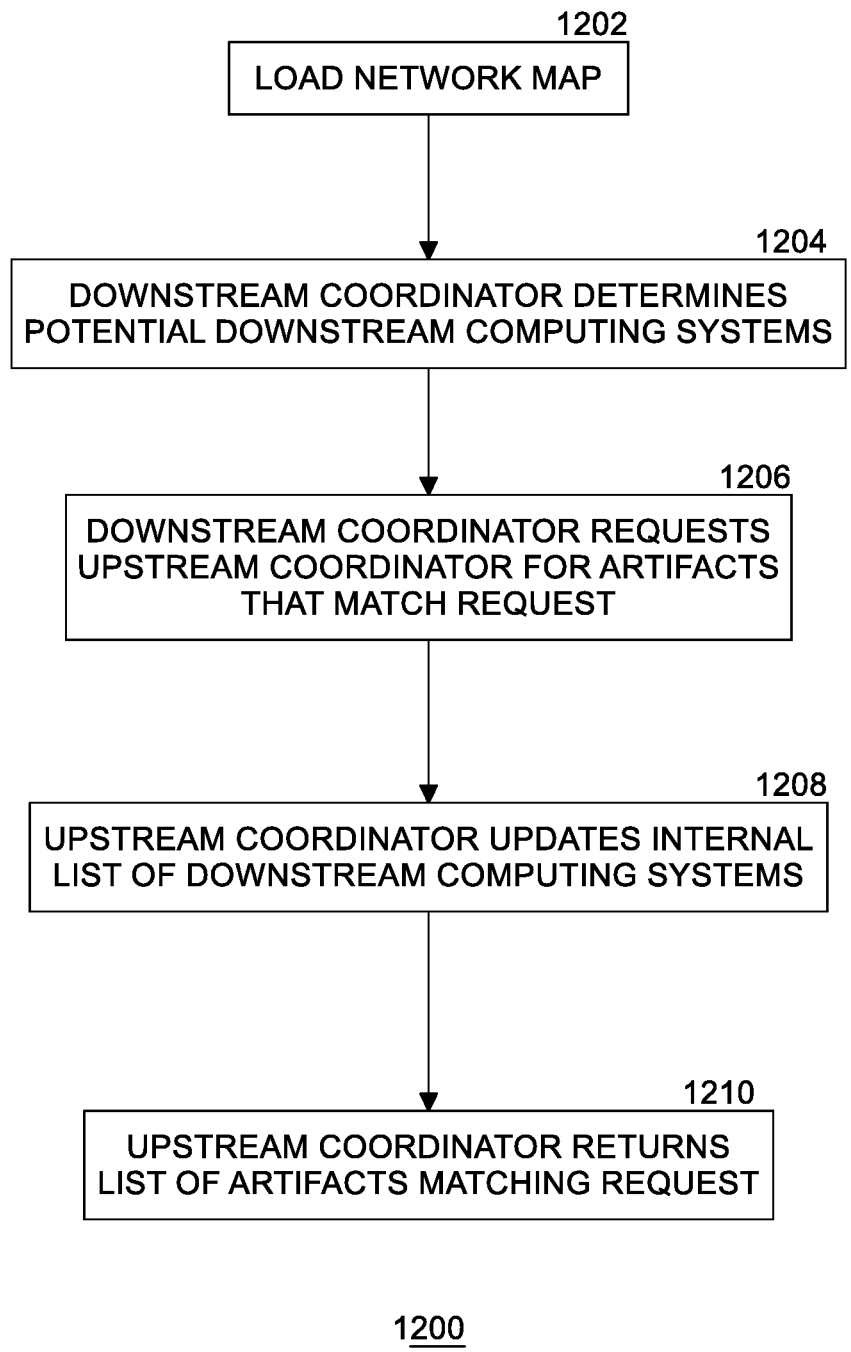
FIG. 12 is a flow diagram of determining synchronization of artifacts according to some embodiments.

FIG. 12 is a flow diagram 1200 of determining synchronization of artifacts according to some embodiments. In an embodiment, at block 1202, a coordinator 1106 in a downstream computing system 1104 loads a map 1102 of the cloud computing environment network topology. At block 1204, downstream coordinator 1106 determines (relative to itself) potential downstream computing systems 1108. In an embodiment, this is determined with reference to network map 1102. At block 1206, downstream coordinator 1106 requests a coordinator 1112 of an upstream computing system 1110 for artifacts that match a request by the downstream coordinator. In an embodiment, the request includes criteria defining the types, classes, IDs, or tags of artifacts that the downstream coordinator is authorized to receive. At block 1208, upstream coordinator 1112 updates an internal list of downstream computing systems 1114 authorized to receive selected artifacts based at least in part on requests 1116 received from downstream coordinators. At block 1210, upstream coordinator 1112 returns a list of artifacts 1118 matching the received request 1116. In an embodiment, the list of artifacts 1118 includes tags identifying the artifacts that match tags included in the request. This prevents downstream computing systems from ever having artifacts that they never need to synchronize with their downstream computing systems.

Figure 13:
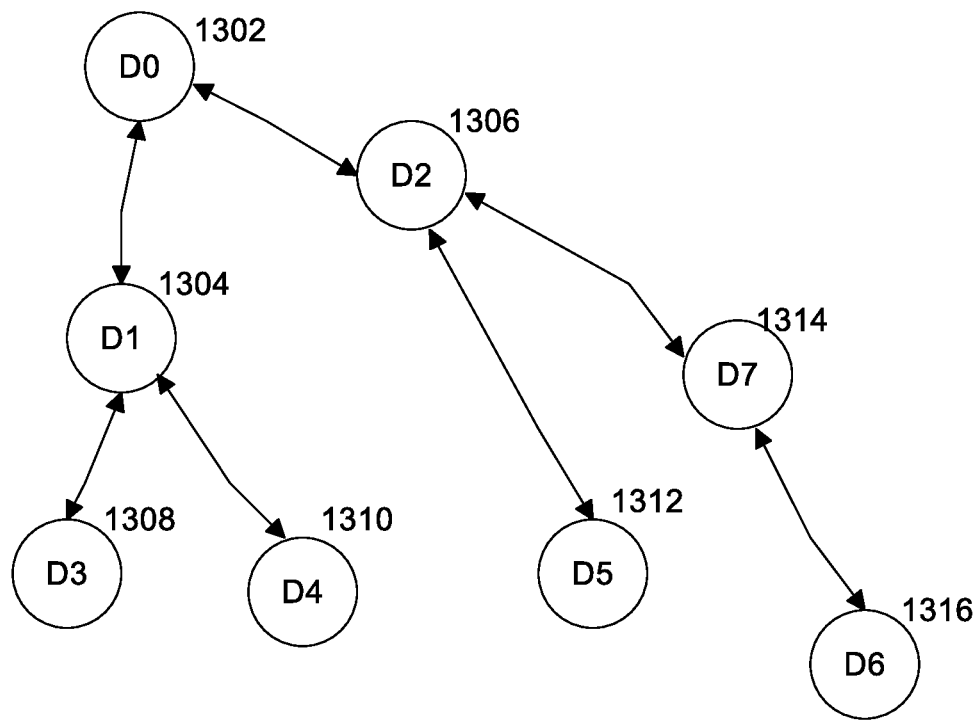
FIG. 13 illustrates an example cloud computing environment network topology.

FIG. 13 illustrates an example cloud computing environment network topology 1200. In this sample network, computing system D0 1302 operates only as an upstream computing system, computing systems D1 1304, D2 1306, and D7 1314 operate as both an upstream computing system and a downstream computing system, and computing systems D3 1308, D4 1310, D5 1312, and D6 1316 operate only as downstream computing systems. Because the list of artifacts 1118 includes tags identifying the artifacts that match tags included in the request, computing systems D1 1304, D3 1308, and D4 1310, for example, do not request and do not receive artifacts tagged to computing systems D2 1306, D5

1312, D7 1314, and D6 1316. This simplifies computing system-specific synchronization of artifacts and results in less artifact distribution traffic in the cloud computing environment. Similarly, computing systems D2 1306, D5 1312, D7 1314, and D6 1316, for example, do not request and do not receive artifacts tagged to computing systems D1 1304, D3 1308, and D4 1310.

Figure 14:
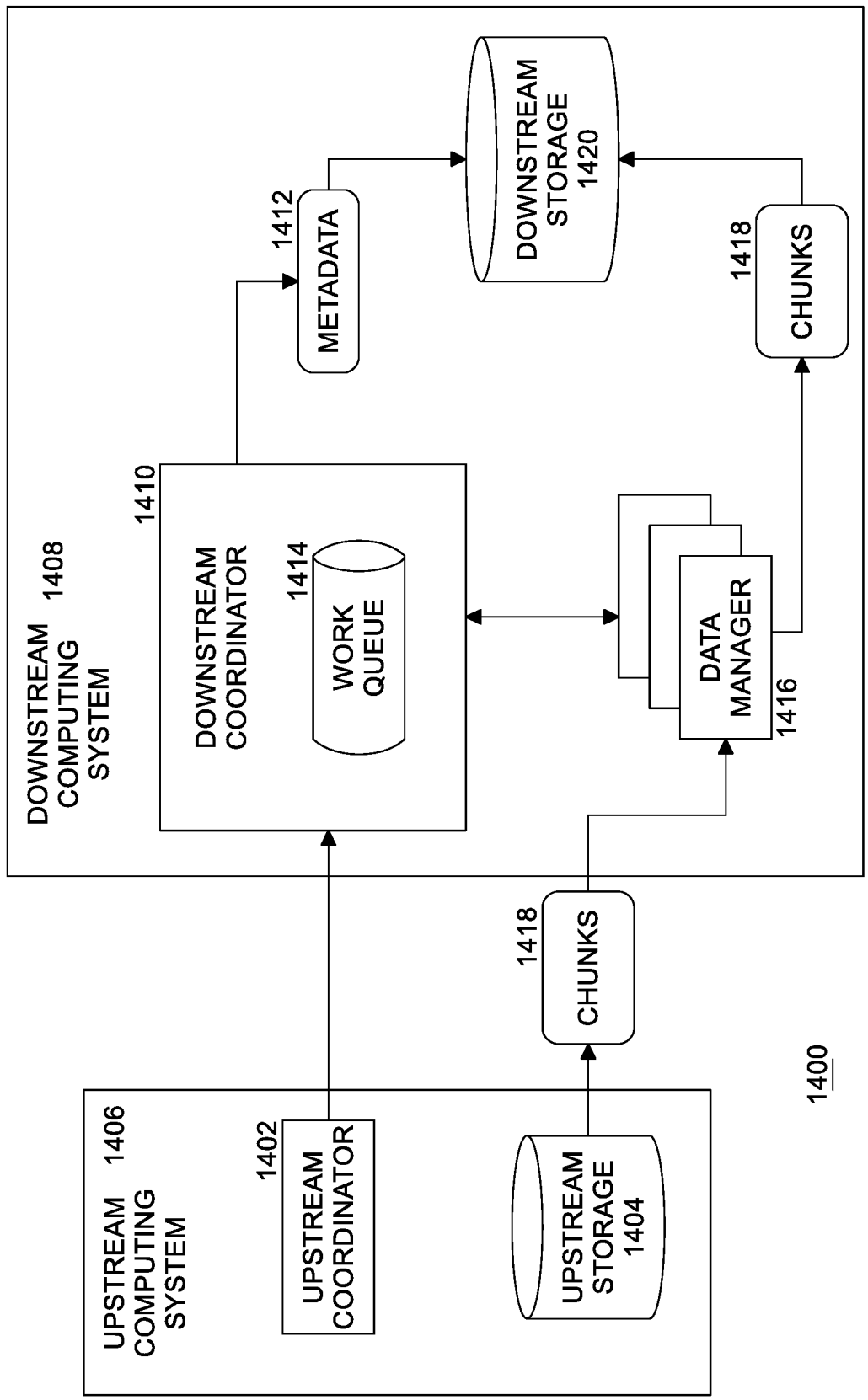
FIG. 14 illustrates a system for synchronization of artifacts according to some embodiments.

FIG. 14 illustrates a system for synchronization of artifacts according to some embodiments. In embodiments, downstream coordinator 1410 is an active agent in downstream computing system 1408 responsible for maintaining dynamic information about which chunks are being requested and distributed and for continually adjusting the priority of chunks being requested. In an embodiment upstream coordinator 1402 of upstream computing system 1406 fields requests from downstream computing systems such as downstream computing system 1408, which need to be notified when selected artifacts (or class of artifacts) are available for distribution.

Downstream coordinator 1410 updates metadata 1412 describing an artifact and the artifact's chunks. Downstream coordinator 1410 includes at least one work queue 1414 (e.g., a priority queue as discussed above) to store information about distribution of artifacts and chunks. Downstream coordinator 1410 adds information about chunks 1418 of a requested artifact to the work queue 1414. Based at least in part on communication with downstream coordinator 1410, at least one of a plurality of data managers 1416 polls work queue 1410 in downstream coordinator 1410 and retrieves chunks 1418 from upstream storage 1404 in upstream computing system 1402. Data manager 1416 stores the chunks 1418 into downstream storage 1420. Chunks 1418 are then ready to be sent to another computing system further downstream than downstream computing system 1408 in response to a request for distribution.

Figure 15:
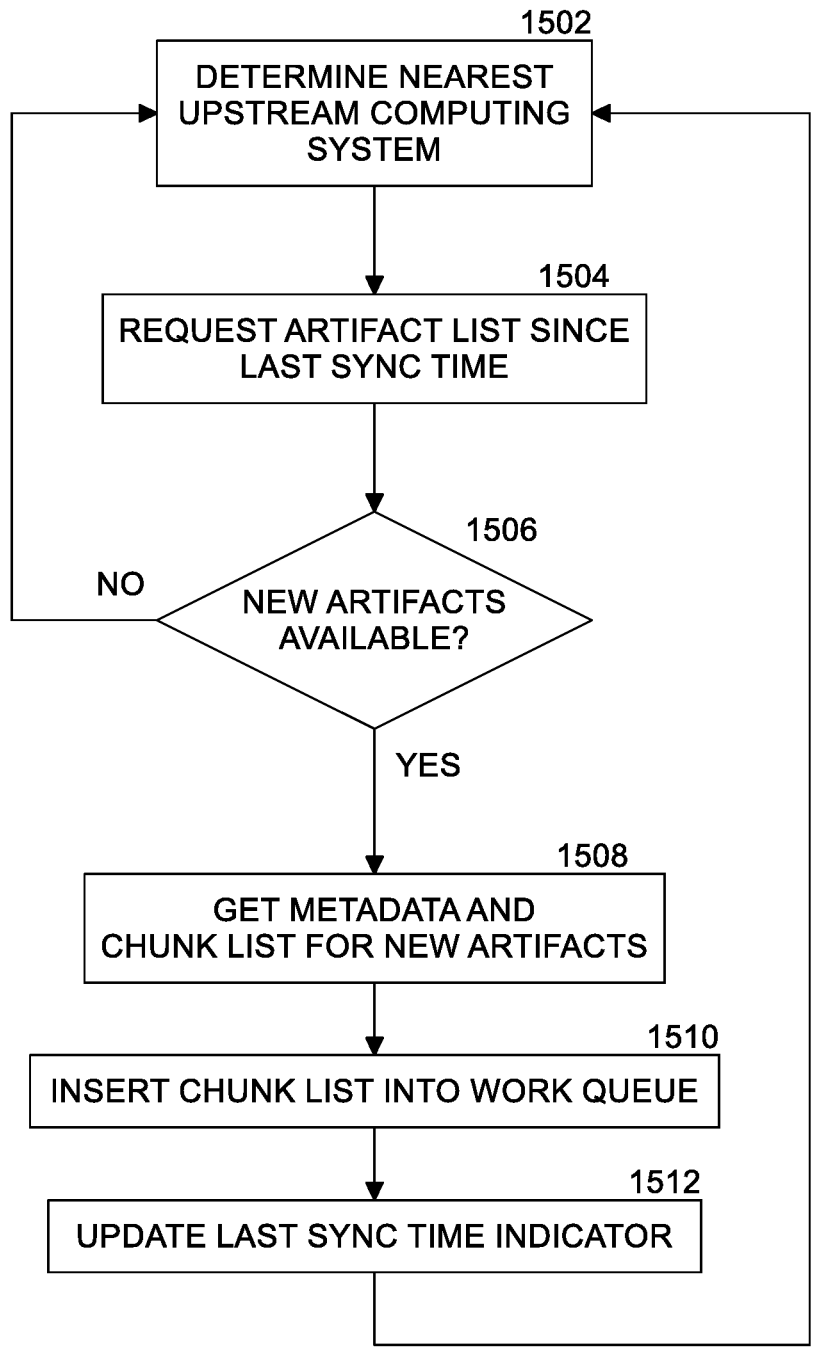
FIG. 15 is a flow diagram of synchronizing artifacts by a coordinator according to some embodiments.

FIG. 15 is a flow diagram 1500 of synchronizing artifacts by a coordinator according to some embodiments. At block 1502, a downstream coordinator 1410 determines the nearest upstream computing system 1406 for sourcing artifacts (based on network latency or other factors). At block 1504, the downstream coordinator requests a list of artifacts available for synchronization since the last synchronization time. The list of artifacts is requested from the upstream coordinator 1402 of the nearest upstream computing system 1406. The last synchronization time is determined by a time stamp based on the ingestion time stamp from the source of the artifact, thereby ensuring consistency across the entire cloud computing environment. At block 1506, the downstream coordinator determines if one or more new artifacts are available based on the received list of artifacts. If no new artifacts are available, then processing continues with block 1502. If a new artifact is available, processing continues with block 1508, where the downstream coordinator gets metadata 1412 and a chunk list for the new artifacts. Metadata 1412 is written to downstream storage 1420. At block 1510, downstream coordinator 1410 inserts the chunk list into work queue 1414. The priority of the work queue is first-come-first-served (FCFS), but metadata 1412 may dictate a reordering of the work queue. At block 1512, downstream coordinator updates the last sync time indicator.

Figure 16:
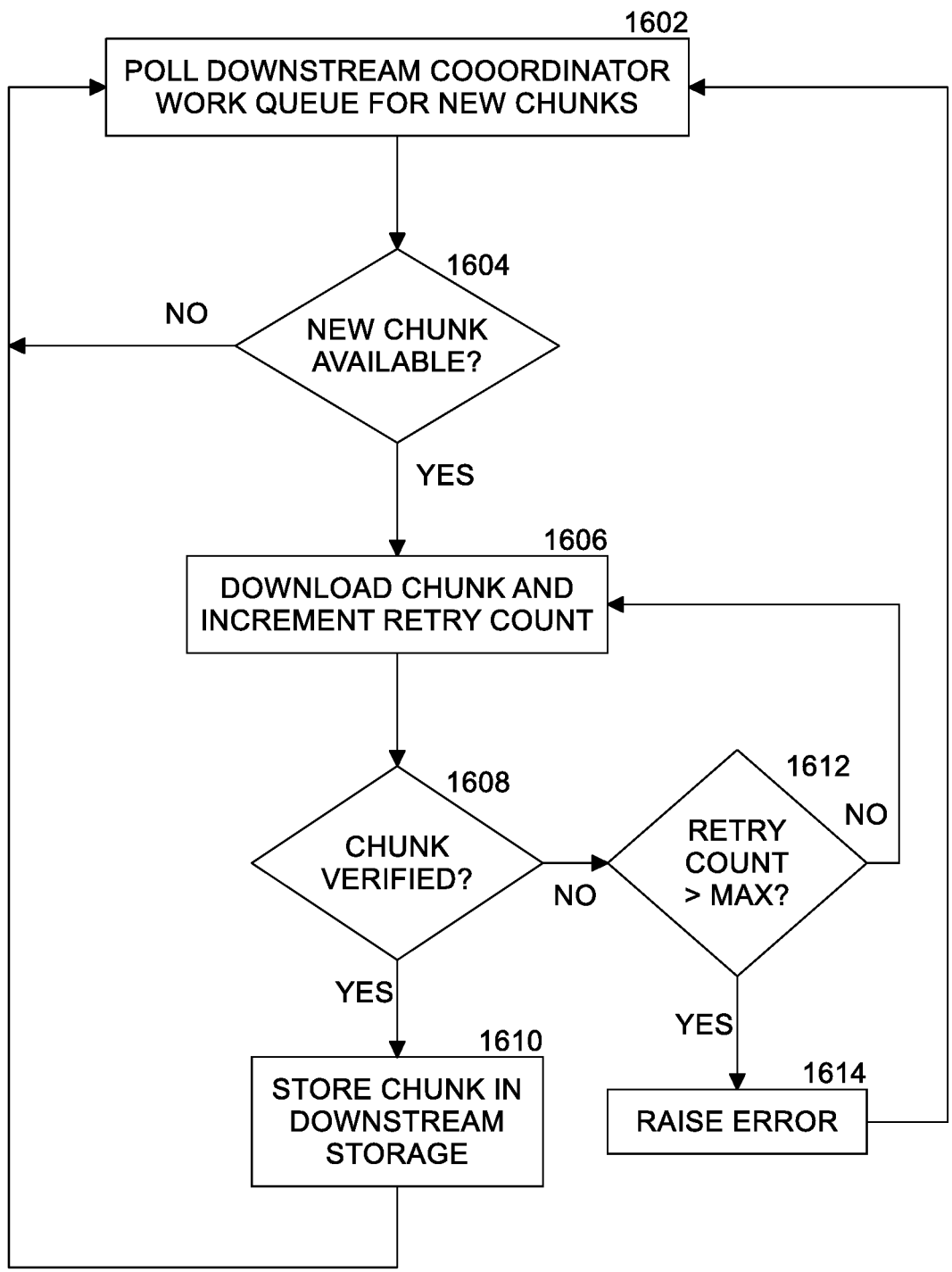
FIG. 16 is a flow diagram of synchronizing artifacts by a data manager according to some embodiments.

FIG. 16 is a flow diagram of synchronizing artifacts by a data manager according to some embodiments. At block 1602, data manager 1416 polls the work queue 1414 in downstream coordinator 1410 for new chunks to distribute. If no new chunk is available at block 1604, then processing returns to block 1602 for further polling. If there is a new chunk available at block 1604, then data manager 1416 downloads a new chunk 1418 from upstream storage 1404 in upstream computing system 1406 and increments a retry count at block 1606. Next, data manager 1416 verifies the chunk. In an embodiment, data manager verifies the chunk by using a checksum. If the chunk is verified successfully at block 1608, then data manager 1416 stores the chunk 1418 in downstream storage 1418. Processing continues with block 1602 by polling for new chunks. If the chunk is not verified at block 1608, the data manager 1416 checks the retry count for the chunk. If the retry count for the chunk is not reached, the data manager downloads the chunk again at block 1606. If the maximum number of retries has been reached at block 1612, then data manager 1416 raises an error at block 1614, and processing continues with further polling at block 1602.

Figure 17:
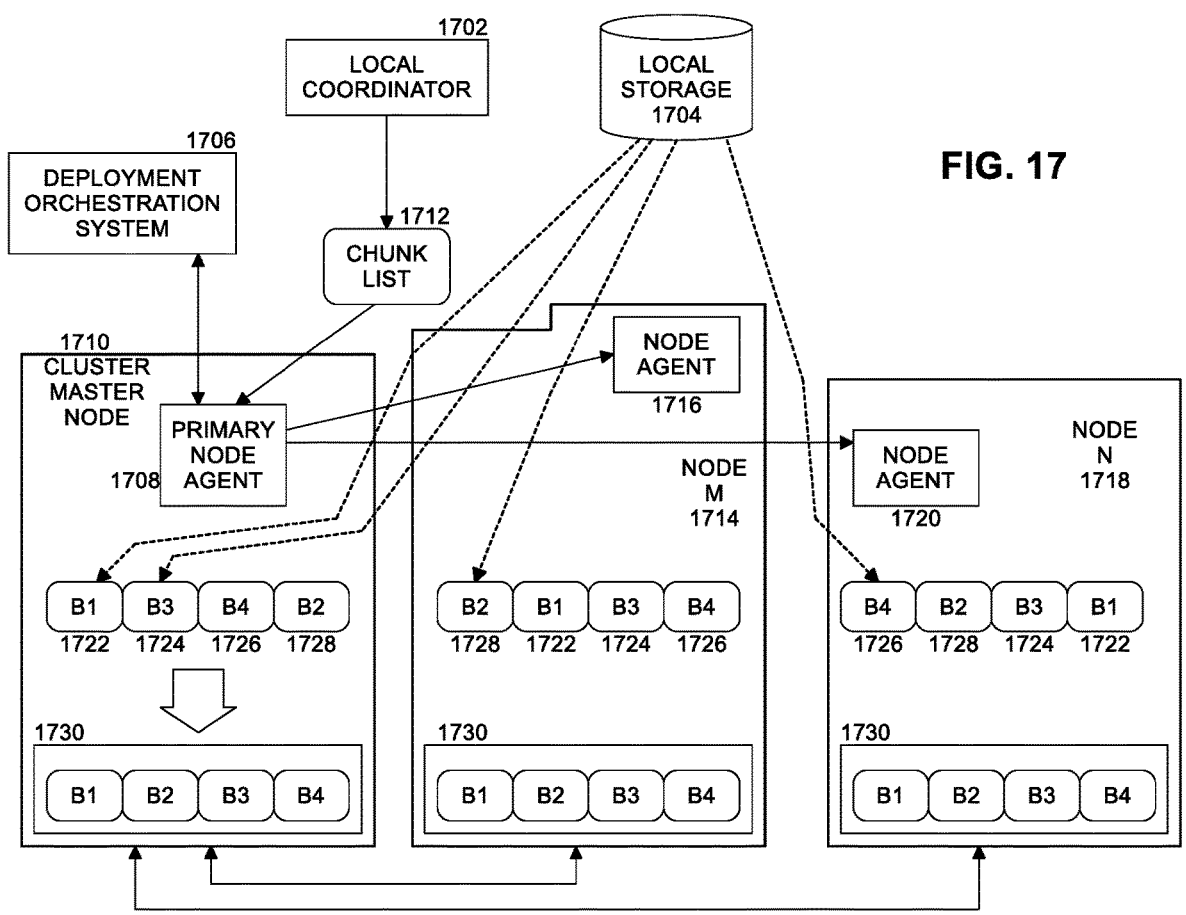
FIG. 17 illustrates a system for reconstructing artifacts from chunks according to some embodiments.

FIG. 17 illustrates a system for reconstructing artifacts from chunks according to some embodiments. Chunks of artifacts are stored in upstream storage 1704 and managed by upstream coordinator 1702. A deployment orchestration system 1706 requests a specific artifact to be downloaded. Deployment orchestration system 1706 notifies a pre-determined node in a downstream computing system known as a cluster master node 1710 in a cluster or rack of servers (e.g., nodes are servers in a downstream computing system). Primary node agent 1708 in cluster master node 1710 downloads chunk list 1712 from upstream coordinator 1702. Upon receipt of chunk list 1712, primary node agent 1708 shares the chunk list with other node agents (e.g., node agent 1716 of node M 1714, . . . , node agent 1720 of node N 1718) of other nodes in the same local cluster/rack in the downstream computing system. Each node agent downloads selected chunks from upstream storage 1704. In an embodiment, each node agent does not need to download all chunks of chunk list 1712. Instead, a node agent downloads one or more selected chunks and the rest of the chunks of the artifact can be obtained from peer nodes. This alleviates the load on upstream storage 1704 while making maximum use of faster intra-node network connections. For example, an artifact could have four chunks B1 1722, B2 1724, B3 1726, and B4 1728. Primary node agent 1708 downloads chunks B1 1722 and B3 1724, node agent 1716 downloads B2 1728, and node agent 1720 downloads B4 1726. Note that the receipt of chunks by nodes is nondeterministic with regards to time. That is, chunks can arrive at nodes in different orders than originally existing in the artifact. Node agents then get chunks from peer nodes as needed to be able to reconstruct the artifact. For example, node agent 1716 gets B1 1722 and B3 1724 from cluster master node 1710 and B4 1726 from node N 1718, node agent 1720 gets B1 1722 and B3 1724 from cluster master node 1710 and B2 1728 from node M 1716, and primary node agent 1708 gets B2 1728 from node M 1714 and B4 1726 from node N 1718. Once all chunks of an artifact are received, primary node agent 1708 validates the chunks. If validated, the primary node agent writes the chunks in the correct order to local storage (not shown in FIG. 17) to reconstruct the original artifact. The primary node agent validates the reconstructed artifact 1730. Reconstructed artifact 1730 can be shared with the other nodes or can be reconstructed by each node. Primary node agent 1708 notifies deployment orchestration system 1706 that the artifact is ready for consumption.

Figure 18:
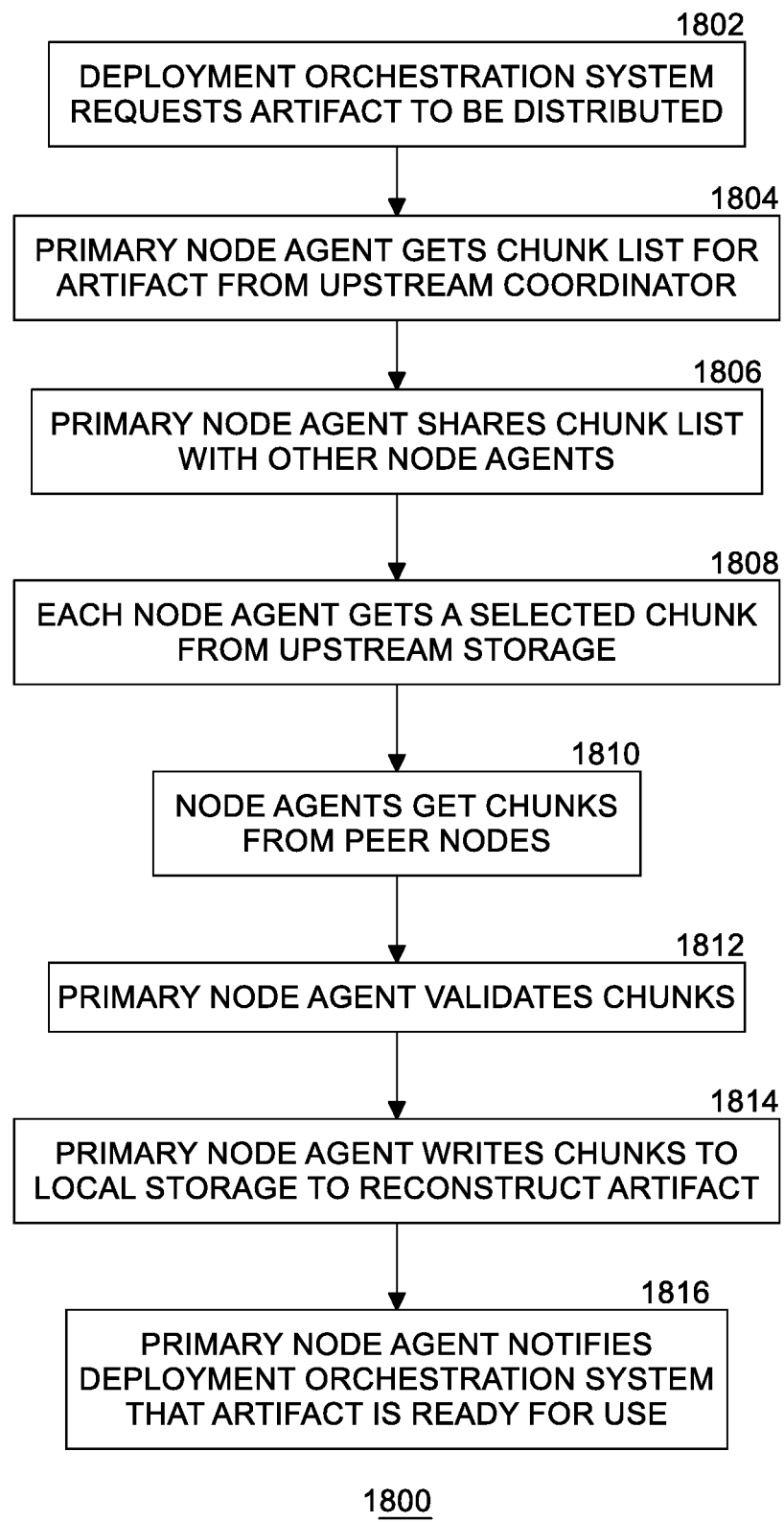
FIG. 18 is a flow diagram of reconstructing artifacts from chunks according to some embodiments.

FIG. 18 is a flow diagram 1800 of reconstructing artifacts from chunks according to some embodiments. At block 1802, deployment orchestration system 1706 requests that an artifact be distributed. At block 1804, primary node agent 1708 gets a chunk list 1712 from upstream coordinator 1702. At block 1806, primary node agent 1708 shares the chunk list with other node agents 1716, . . . 1720. At block 1808, each node agent 1716, . . . 1720 gets one or more chunks from the chunk list from upstream storage 1704. At block 1810, each node agent gets chunks as needed from other (e.g., peer) nodes. At block 1810, primary node agent 1708 validates the received chunks. If the validation is successful, the primary node agent writes the chunks at block 1814 to a local storage to reconstruct the requested artifact. At block 1816, the primary node agent notifies the deployment orchestration system 1706 that the artifact is ready for use.

Figure 19:
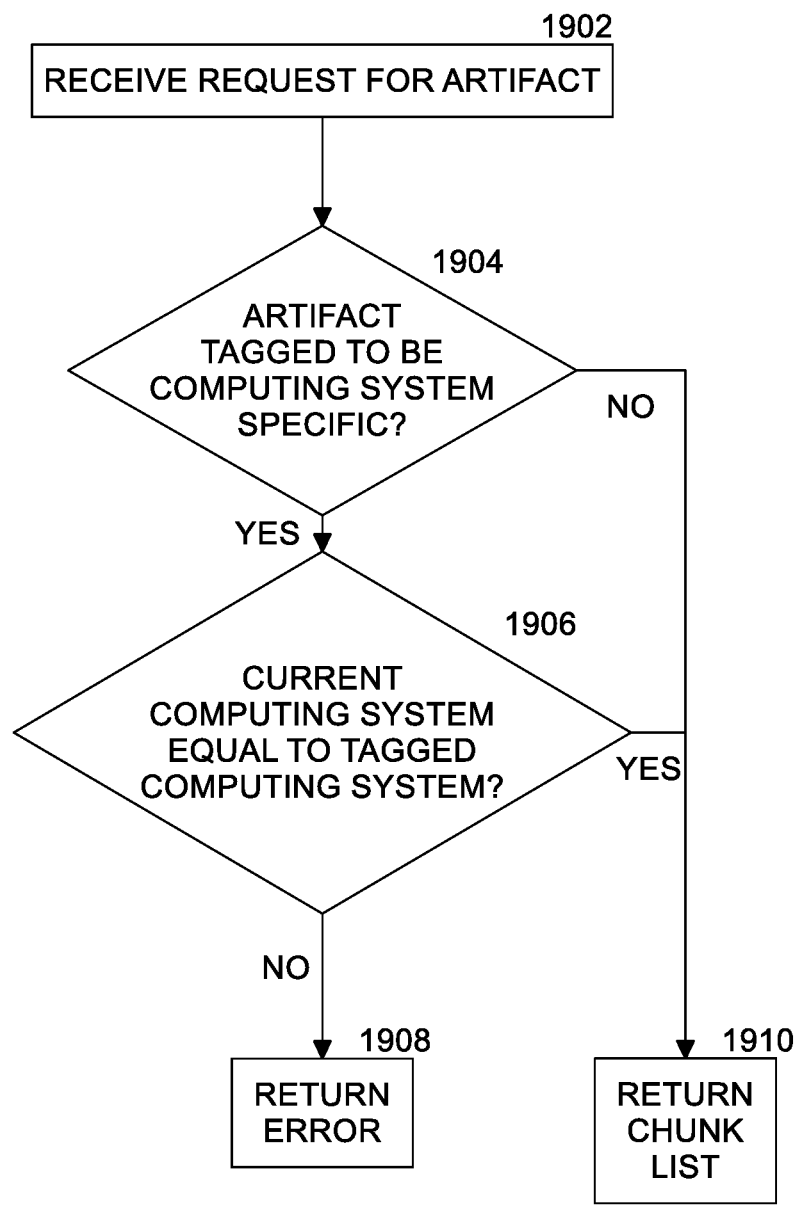
FIG. 19 is a flow diagram of determining synchronization of tagged artifacts according to some embodiments.

FIG. 19 is a flow diagram 1900 of determining synchronization of tagged artifacts according to some embodiments. In an embodiment, artifacts can be tagged for distribution to selected downstream computing systems in the cloud computing environment. In this case, synchronization proceeds as described above. To ensure that an artifact tagged for a specific computing system is accessible only in that computing system, during last mile delivery the upstream coordinator disallows node agents from retrieving a chunk if the current downstream computing system does not belong to a tagged list of authorized downstream computing systems. At block 1902, a request for an artifact is received by an upstream coordinator. At block 1904, if the artifact is tagged to be distributed to a specific computing system in the cloud computing environment, processing continues with block 1906. Otherwise, processing continues with block 1910 where the upstream coordinator returns the chunk list to the requester. At block 1906, if the current computing system (e.g., the one requesting the artifact) is equal to or otherwise matches the tagged computing system (e.g., the requesting computing system is authorized to get the artifact), then the chunk list is returned at block 1910. Otherwise and error is returned at block 1908.

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an implementation," "one implementation," "some implementations," or "certain implementations" indicates that a particular feature, structure, or characteristic described in connection with the implementation is included in at least one implementation. Thus, the appearances of the phrase "an implementation," "one implementation," "some implementations," or "certain implementations" in various locations throughout this specification are not necessarily all referring to the same implementation.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "generating," "adding," "subtracting," "multiplying," "dividing," "optimizing," "calibrating," "detecting," "performing," "analyzing," "determining," "enabling," "identifying," "modifying," "transforming," "applying," "aggregating," "extracting," "registering," "querying," "populating," "hydrating," "updating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which a computing environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM, and the like without departing from the scope of the implementations claimed. Moreover, the implementations are applicable to other systems and environments including, but not limited to, client-server models, mobile technology and devices, wearable devices, and on-demand services.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™ (a trademark of Sun Microsystems, Inc.), or Perl using, for example, existing or object-oriented techniques. The software code can be stored as non-transitory instructions on any type of tangible computer-readable storage medium (referred to herein as a "non-transitory computer-readable storage medium"). Examples of suitable media include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

The disclosure also relates to apparatuses, devices, and system adapted/configured to perform the operations herein. The apparatuses, devices, and systems may be specially constructed for their required purposes, may be selectively activated or reconfigured by a computer program, or some combination thereof.

In the foregoing description, numerous details are set forth. It will be apparent, however, to one of ordinary skill in the art having the benefit of this disclosure, that the present disclosure may be practiced without these specific details. While specific implementations have been described herein, it should be understood that they have been presented by way of example only, and not limitation. The breadth and scope of the present application should not be limited by any of the implementations described herein, but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A cloud computing system, comprising:
a processing device; and
a memory device coupled to the processing device, the memory device having instructions stored thereon that, in response to execution by the processing device, cause the processing device to:
determine a nearest upstream computing system in a network of computing systems;
request a list of artifacts received by the nearest upstream computing system since a last synchronization time, the artifacts including files of a continuous integration (CI) process;
when a new artifact is available, get metadata and a chunk list for the new artifact and update a last synchronization time indicator, and write an artifact record for the new artifact into a queue, the artifact record including the metadata and the chunk list;
poll the queue for entries for the artifact records of artifacts;
when an entry exists for the new artifact, get the new artifact from the nearest upstream computing system;
divide the new artifact into a plurality of chunks according to the chunk list;
when the plurality of chunks is available for distribution, store the plurality of chunks into a shared storage accessible by downstream computing systems of the network;
determine one or more of the downstream computing systems to receive the new artifact;
receive requests from the one or more downstream computing systems for chunks of the new artifact;
send the chunks to the one or more downstream computing systems from the shared storage for reconstruction of the new artifact from the chunks.

2. The cloud computing system of claim 1, wherein the new artifact comprises a component of a version of a software application.

3. The cloud computing system of claim 1, wherein the new artifact comprises information that a software application in the cloud computing environment communicates to one or more end-users or to another software application.

4. The cloud computing system of claim 1, wherein the processing device to get the new artifact comprises instructions for execution by the processing device to receive a notification of the new artifact for distribution, assign a time stamp to the new artifact, determine chunk boundaries, and save metadata associated with the new artifact in the shared storage.

5. The cloud computing system of claim 1, wherein the processing device to determine downstream computing systems to receive the new artifact comprises instructions for execution by the processing device to determine other potential downstream computing systems coupled to the downstream computing system according to a network map of the computing systems in the cloud computing system.

6. The cloud computing system of claim 1, wherein the requests include criteria defining the types, classes, identifiers (IDs), or tags of artifacts that the downstream computing system is authorized to receive.

7. The cloud computing system of claim 6, wherein the processing device to determine downstream computing systems to receive the new artifact comprises instructions for execution by the processing device to update a list of downstream computing systems authorized to receive the new artifact based on the criteria.

8. The cloud computing system of claim 7, wherein the processing device to send the chunks to the one or more downstream computing systems comprises instructions for execution by the processing device to send the chunks of the new artifact to the one or more downstream computing systems when the one or more downstream computing systems is on the list of downstream computing systems authorized to receive the new artifact.

9. The cloud computing system of claim 1, the memory device having further instructions stored thereon that, in response to execution by the processing device, cause the processing device to get chunks on the new artifact's chunk list.

10. A computer-implemented method comprising:
determining a nearest upstream computing system in a network of computing systems;
requesting a list of artifacts received by the nearest upstream computing system since a last synchronization time, the artifacts including files of a continuous integration (CI) process;
when a new artifact is available, getting metadata and a chunk list for the new artifact, updating a last synchronization time indicator, and writing an artifact record for the new artifact into a queue, the artifact record including the metadata and the chunk list;
polling the queue for entries for artifact records of artifacts;
when an entry exists for the new artifact, getting the new artifact from the nearest upstream computing system;
dividing the new artifact into a plurality of chunks according to the chunk list;
when the plurality of chunks is available for distribution, storing the plurality of chunks into a shared storage accessible by downstream computing systems of the network;
determining one or more downstream computing systems in the network to receive the new artifact;
receiving requests from the one or more downstream computing systems for chunks of the new artifact; and
sending the chunks to the one or more downstream computing systems from the shared storage for reconstruction of the new artifact from the chunks.

11. The method of claim 10, wherein the new artifact comprises a component of a version of a software application.

12. The method of claim 10, wherein the new artifact comprises information that a software application in the cloud computing environment communicates to one or more end-users or to another software application.

13. The method of claim 10, wherein getting the new artifact comprises receiving a notification of the new artifact for distribution, assigning a time stamp to the new artifact, determining chunk boundaries, and saving metadata associated with the new artifact in the shared storage.

14. The method of claim 10, wherein determining downstream computing systems to receive the new artifact comprises determining other potential downstream computing systems coupled to the downstream computing system according to a network map of the computing systems in the cloud computing system.

15. The method of claim 10, wherein the requests include criteria defining the types, classes, identifiers (IDs), or tags of artifacts that the downstream computing system is authorized to receive.

16. The method of claim 15, wherein determining downstream computing systems to receive the new artifact comprises updating a list of downstream computing systems authorized to receive the new artifact based on the criteria.

17. The method of claim 16, wherein sending the chunks to the one or more downstream computing systems comprises sending the chunks of the new artifact to the one or more downstream computing systems when the one or more downstream computing systems is on the list of downstream computing systems authorized to receive the new artifact.

18. The method of claim 10, comprising getting chunks on the new artifact's chunk list.

19. A tangible, non-transitory computer-readable storage medium having instructions encoded thereon which, when executed by a processing device, cause the processing device to:
determine a nearest upstream computing system in a network of computing systems;
request a list of artifacts received by the nearest upstream computing system since a last synchronization time, the artifacts including files of a continuous integration (CI) process;
when a new artifact is available, get metadata and a chunk list for the new artifact and update a last synchronization time indicator and write an artifact record for the new artifact into a queue, the artifact record including the metadata and the chunk list;
poll the queue for entries for artifact records of artifacts;
when an entry exists for the new artifact, get the new artifact from the nearest upstream computing system;
divide the new artifact into a plurality of chunks;
when the plurality of chunks is available for distribution, store the plurality of chunks into a shared storage accessible by downstream computing systems of the network;
determine one or more downstream computing systems in the network to receive the new artifact;
receive requests from one or more downstream computing systems for a chunk of the new artifact; and
send the chunks to the one or more downstream computing systems from the shared storage for reconstruction of the new artifact from the chunks.

20. The tangible, non-transitory computer-readable storage medium of claim 19, wherein the instructions to cause the processing device to get the new artifact comprise instructions for execution by the processing device to receive a notification of the new artifact for distribution, assign a time stamp to the new artifact, determine chunk boundaries, and save metadata associated with the new artifact in the shared storage.

21. The tangible, non-transitory computer-readable storage medium of claim 19, wherein instructions to cause the processing device to determine downstream computing systems to receive the new artifact comprise instructions for execution by the processing device to determine other potential downstream computing systems coupled to the downstream computing system according to a network map of the computing systems in the cloud computing system.

22. The tangible, non-transitory computer-readable storage medium of claim 19, wherein the requests include criteria defining the types, classes, identifiers (IDs), or tags of artifacts that the downstream computing system is authorized to receive.

23. The tangible, non-transitory computer-readable storage medium of claim 22, wherein the instructions to cause the processing device to determine downstream computing systems to receive the new artifact comprise instructions for execution by the processing device to update a list of downstream computing systems authorized to receive the new artifact based on the criteria.

24. The tangible, non-transitory computer-readable storage medium of claim 23, wherein the instructions to cause processing device to send the chunks to the one or more downstream computing systems comprise instructions for execution by the processing device to send the chunks of the new artifact to the one or more downstream computing systems when the one or more downstream computing systems is on the list of downstream computing systems authorized to receive the new artifact.

25. A system comprising:
a shared storage;
an upstream computing system to determine a nearest upstream computing system in a network of computing systems, request a list of artifacts received by the nearest upstream computing system since a last synchronization time, the artifacts including files of a continuous integration (CI) process, when a new artifact is available, get metadata and a chunk list for the new artifact and update a last synchronization time indicator, and write an artifact record for the new artifact into a queue, the artifact record including the metadata and the chunk list poll the queue for entries for artifact records of artifacts; when an entry exists for the new artifact, to get the new artifact, divide the new artifact into a plurality of chunks, when the plurality of chunks is available for distribution, store the plurality of chunks into the shared storage, and determine one or more of a plurality of downstream computing systems in the network to receive the new artifact; and
one or more downstream computing systems, coupled to the upstream computing system and the shared storage, to send requests to the upstream computing system for chunks of the new artifact; receive the chunks from the shared storage; and reconstruct the new artifact from the chunks.

26. The system of claim 25, wherein the new artifact comprises a component of a version of a software application.

27. The system of claim 25, wherein the new artifact comprises information that a software application in a cloud computing environment communicates to one or more end-users or to another software application.

28. The system of claim 25, wherein the requests include criteria defining the types, classes, identifiers (IDs), or tags of artifacts that the one or more downstream computing systems is authorized to receive.

29. The system of claim 28, the upstream computing system to update a list of downstream computing systems authorized to receive the new artifact based on the criteria.

30. The system of claim 29, the upstream computing system to send chunks of the new artifact to the one or more downstream computing systems when the one or more downstream computing systems is on the list of downstream computing systems authorized to receive the new artifact.

* * * * *